US010999276B2

(12) United States Patent
Umezurike

(10) Patent No.: US 10,999,276 B2
(45) Date of Patent: May 4, 2021

(54) INDUSTRIAL INTERNET ENCRYPTION SYSTEM

(71) Applicant: Josiah Johnson Umezurike, Columbia, SC (US)

(72) Inventor: Josiah Johnson Umezurike, Columbia, SC (US)

(*) Notice: Subject to any disclaimer, the term of this patent is extended or adjusted under 35 U.S.C. 154(b) by 147 days.

(21) Appl. No.: 16/393,956

(22) Filed: Apr. 24, 2019

(65) Prior Publication Data

US 2020/0059470 A1 Feb. 20, 2020

Related U.S. Application Data

(63) Continuation-in-part of application No. 15/875,378, filed on Jan. 19, 2018, and a continuation-in-part of application No. 13/364,339, filed on Feb. 2, 2012, now abandoned.

(60) Provisional application No. 62/661,765, filed on Apr. 24, 2018.

(51) Int. Cl.
*H04L 29/06* (2006.01)

(52) U.S. Cl.
CPC ...... *H04L 63/0876* (2013.01); *H04L 63/0823* (2013.01); *H04L 63/0861* (2013.01); *H04L 63/102* (2013.01)

(58) Field of Classification Search
CPC .. H04L 63/0876; H04L 63/0823; H04L 63/20
See application file for complete search history.

(56) References Cited

U.S. PATENT DOCUMENTS

| 9,503,452 | B1 * | 11/2016 | Kumar | H04L 67/306 |
| 2017/0126577 | A1 * | 5/2017 | Sender | H04W 4/02 |
| 2017/0187807 | A1 * | 6/2017 | Clernon | H04L 41/0806 |

(Continued)

*Primary Examiner* — Lynn D Feild
*Assistant Examiner* — Viral S Lakhia
(74) *Attorney, Agent, or Firm* — Gibraltar Consulting LLC; Tariq S. Najee-ullah

(57) ABSTRACT

The present disclosure provides an industrial internet encryption system for an internet of things (IoT) environment. The present disclosure provides an apparatus, a system, and a method for providing an industrial internet encryption system comprising: accessing an application module; initiating registration with the application module; completing registration with the application module by providing profile attributes; locally encrypting registration profile attributes; authenticating into a networked environment using encrypted registration information; and maintaining registration information for one or more devices. The method further comprising wherein the profile attributes are at least one of: a fingerprint, a name, a media access control (MAC) address, an international mobile equipment identity (IMEI) number, a password, a cellular phone number, an address, a date of birth, a driver's license, an email address, a username, data nucleus aggregated information (DNA), digital data nucleic authority (DDNA) information, and other personally identifiable information. The present disclosure provides an industrial internet encryption system comprising: a server; an industrial internet encryption system application module; a user interface module; a lokchain module; an endpoint to endpoint cryptographic module for generating secret keys; and an industrial internet encryption system server.

19 Claims, 20 Drawing Sheets

(56) References Cited

U.S. PATENT DOCUMENTS

| | | | |
|---|---|---|---|
| 2017/0339141 A1* | 11/2017 | Doyle | H04M 1/67 |
| 2017/0373853 A1* | 12/2017 | Soman | G06F 21/56 |
| 2018/0139601 A1* | 5/2018 | Dowlatkhah | H04W 8/18 |
| 2018/0176017 A1* | 6/2018 | Rodriguez | H04L 63/0861 |
| 2018/0212970 A1* | 7/2018 | Chen | H04L 63/101 |
| 2019/0158653 A1* | 5/2019 | Sonntag | H04W 12/0608 |
| 2019/0199521 A1* | 6/2019 | Sayers | H04L 9/14 |
| 2019/0319808 A1* | 10/2019 | Fallah | H04L 9/30 |
| 2020/0026834 A1* | 1/2020 | Vimadalal | G06F 16/182 |

\* cited by examiner

Table 1

| WYA | WYH | WYK |
|---|---|---|
| electronic Finger Print (eFP) | Registered Company email/email | Password |
| Other Biometrics | SS | MPIN |
| | DOB | |
| | Location addr/company addr | |
| | FULLNAME/COMPANY NAME | |
| | FEIN | |
| | PP | |
| | IMEI/MAC/UID | |
| | Cell Phone/mobile number in use | |
| | Username | |
| | Soft/Hard Token | |
| | Driver license (DL) | |

*FIG. 9*

Encryption/decryption components and eFRI components Fig.
Table 1.1a eFRI String Derivation mechanism Fig.
Table 1.1b Table 3

| WYA | WYH | WYK |
|---|---|---|
| electronic Finger Print (eFRI) | Registered Company email/email | Password |
| Vein pattern | SS | MPIN |
| Typing cyban | DOB | |
| Signature recognition | Location addr/company addr | |
| Gait recognition | FULL NAME /COMPANY NAME | |
| Mouse movement analysis | FEIN | |
| | PP | |
| | IMEI/MAC/UID | |
| | Cell Phone/mobile number in use | |
| | Username | |
| | Soft/Hard Token | |
| | Driver license (DL) | |

INDUSTRIAL INTERNET ENCRYPTION SYSTEM

RELATED APPLICATION(S)

Under provisions of 35 U.S.C. § 119(e), the Applicant claim the benefit of U.S. provisional application No. 62/661,765 entitled "INDUSTRIAL INTERNET ENCRYPTION SYSTEM 1.0 (IIES1)," filed Apr. 24, 2018, is hereby incorporated herein by reference.

Related U.S. provisional application No. 62/448,560 entitled "ENDPOINT-TO-ENDPOINT CRYPTOGRAPHIC SYSTEM FOR MOBILE AND IOT DEVICES" filed Jan. 20, 2017, is hereby incorporated by reference.

Related U.S. provisional application No. 62/584,736 entitled "Distributed Ledger Systems for eTransactions (LOKCHAIN)" filed Nov. 10, 2017, is hereby incorporated by reference.

Related U.S. patent application Ser. No. 13/364,339, filed on Feb. 2, 2012 and entitled "SKC-JJU256 Encryption Using Knights Tour Solutions as the Main Key to Create a Cryptosystem," assigned to the assignee of the present application, is hereby incorporated by reference.

Related U.S. patent application Ser. No. 15/875,378, filed on Jan. 19, 2018 and entitled "ENDPOINT-TO-ENDPOINT CRYPTOGRAPHIC SYSTEM FOR MOBILE AND IOT DEVICES," assigned to the assignee of the present application, is hereby incorporated by reference.

Related publication, dated November 2018 and entitled "Lokchain: Interconnection of the Future Blockchain and IoT," is hereby incorporated by reference.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to cryptographic mechanisms and security.

BACKGROUND

In many situations, security over the internet or between wireless devices is provided by public key infrastructure utilizing public key cryptography. For example, a public key infrastructure (PKI) is a system for the creation, storage, and distribution of digital certificates which are used to verify that a particular public key belongs to a certain entity. Thus, the conventional strategy is to use the PKI to create digital certificates which map public keys to entities, securely stores these certificates in a central repository and revokes them if needed.

Public key infrastructure has been the industry standard for many years. In order to use PKI, a user must establish one or more certificate authorities, a hardware security module (HSM), establish one or more websites which store certificates and certificate revocation lists (CRLs), one or more simple computer enrollment protocols (SCEP) servers which enable mobile and network devices to acquire certificates, and hire staff or administrators to manage the entire certificate system.

This often causes problems because the conventional strategy does not address the increasing complexity of the existing PKI system as more and more mobile devices, computers, and electronic network capable devices are added to the system. For example, devices are now being added to the PKI system which contain emerging technologies. Additional problems are being exposed as PKI continues to be relied upon. For example, in functional PKI communication, there are many certificate errors which are only increasing security risk as more and more users continue to use the PKI system. Many key management systems used to store records of keys used in the PKI system are stored on hard drives which are vulnerable to attack.

The PKI system is also vulnerable to hacking by exploiting other weaknesses in networks that PKI has not solved. Most importantly of all problems, as computer processing becomes more inexpensive as Moore's law continues to hold true and Quantum computing continues to develop, the large prime numbers relied upon by public key cryptography to protect secret information will become easier to solve. Long keys will not make up for an insecure system as total security is no stronger than the weakest component in the system. This is also true of the verifying computer in a PKI system as well as the computer that uses the certificate.

There is a need for a more efficient, more robust, comprehensive cryptography system. The present disclosure solves this problem.

BRIEF OVERVIEW

An industrial internet encryption system may be provided. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

The present disclosure provides an advanced cryptosystem called Industrial Internet Encryption System (IIES). The present disclosure provides for a comprehensive solution which may accommodate the emerging technologies including blockchain technology, cryptocurrency, and devices that are part of the internet of things (IoT) ecosystem. The present disclosure provides a solution for the complex intersection and integration of technologies including but not limited to cloud services, solid state devices, more powerful processors, IoT devices, IoT communications, machine learning, artificial intelligence computing system, big data systems, quantum computing systems, smart devices, blockchain systems, decentralized devices, mobile devices, and computers.

The present disclosure provides an advanced cryptosystem solution for the manufacturing industry including but not limited to Supervisory Control and Data Acquisition (SCADA) systems. The present disclosure provides for a computer system security solution which may be used in various environments including but not limited to: for gathering and analyzing real time data; to monitor and control a plant or equipment; to automate or allow for remote control of equipment in industries such as telecommunications, water and waste control, energy, oil and gas refining and transportation.

The present disclosure provides for a Secret Key Infrastructure (SKI) that may be enabled to provide an Industrial Internet Encrpytion System (IIES). The present disclosure provides an advanced crypto-system called Industrial Internet Encryption System (IIES), the system comprising: a Universal Wallet Address system (UAW), a client, and a server. The system further comprising: a user interface module, a registration module, an identity access management module, an encryption/decryption module, profile management module. The system further comprising: a LokChain module, a Lokdown module, an End-to-End (E2E) communication module, a server encryption/decryption module.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 9 Table 1.

DETAILED DESCRIPTION

Figure 1A:
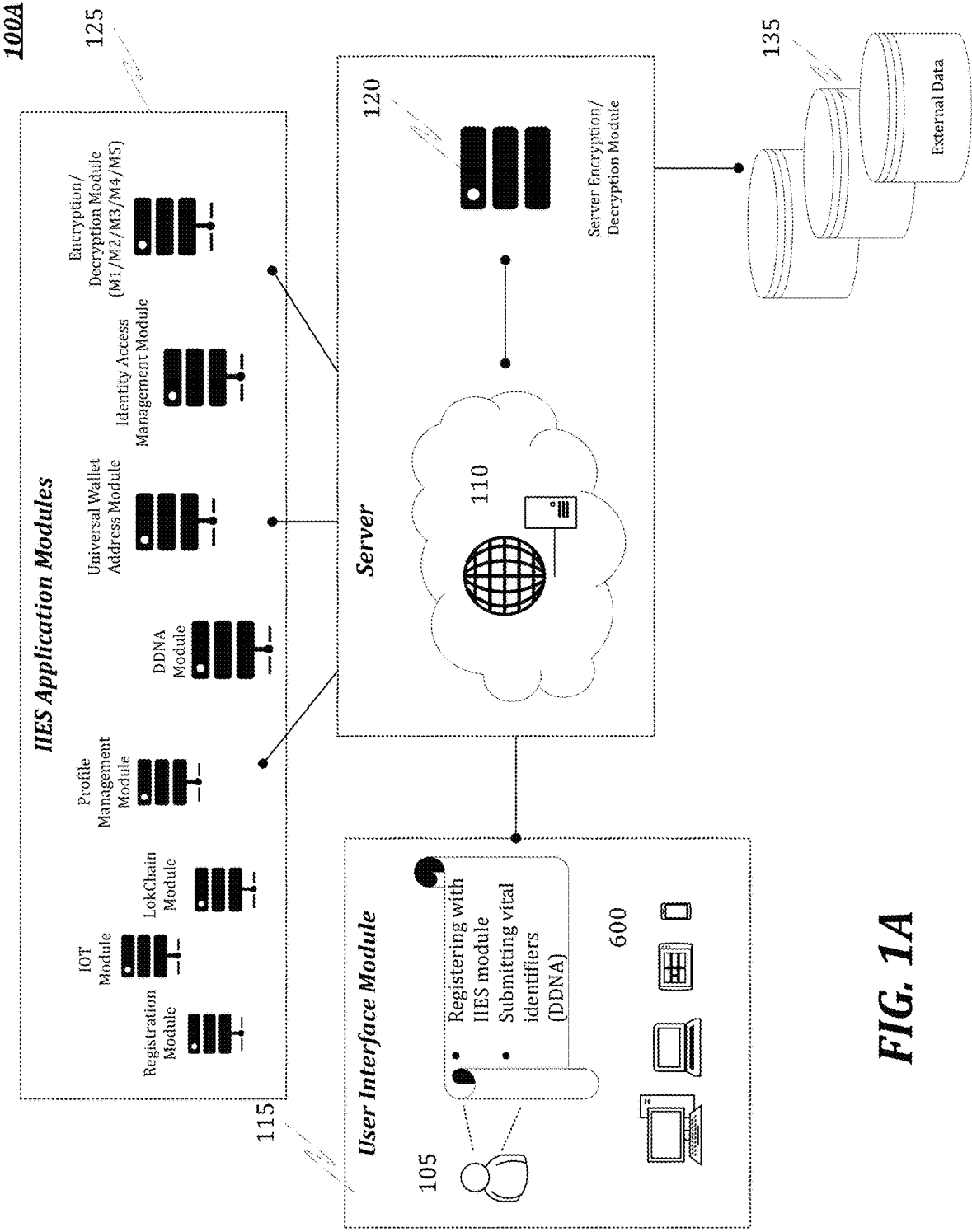
FIG. 1A illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of an industrial cryptographic security system, embodiments of the present disclosure are not limited to use only in this context.

I. Platform Overview

Consistent with embodiments of the present disclosure, an industrial internet encryption system may be provided. This overview is provided to introduce a selection of concepts in a simplified form that are further described below. This overview is not intended to identify key features or essential features of the claimed subject matter. Nor is this overview intended to be used to limit the claimed subject matter's scope. The industrial internet encryption system may be used by individuals or companies to an ecosystem consisting of protocols, a platform and suite of technologies that improve and securely integrate distributed ledgers, mobile and Internet of Things (IoT).

The Industrial Internet Encryption System (IIES) platform may utilize one or more of an Endpoint-to-Endpoint (E2E) Cryptographic System for Mobile and Internet of Things (IoT) Devices and a LokChain (LC) platform to provide a more efficient cryptographic security protection. IIES, E2E, and LokChain are proprietary platforms comprising technologies developed by the applicant. An overview of E2E and LokChain technologies is herein provided as well included by reference based on the documents incorporated into the specification from the Related Applications section above.

FIG. 1A illustrates a block diagram of an operating environment consistent with the present disclosure.

Figure 1B:
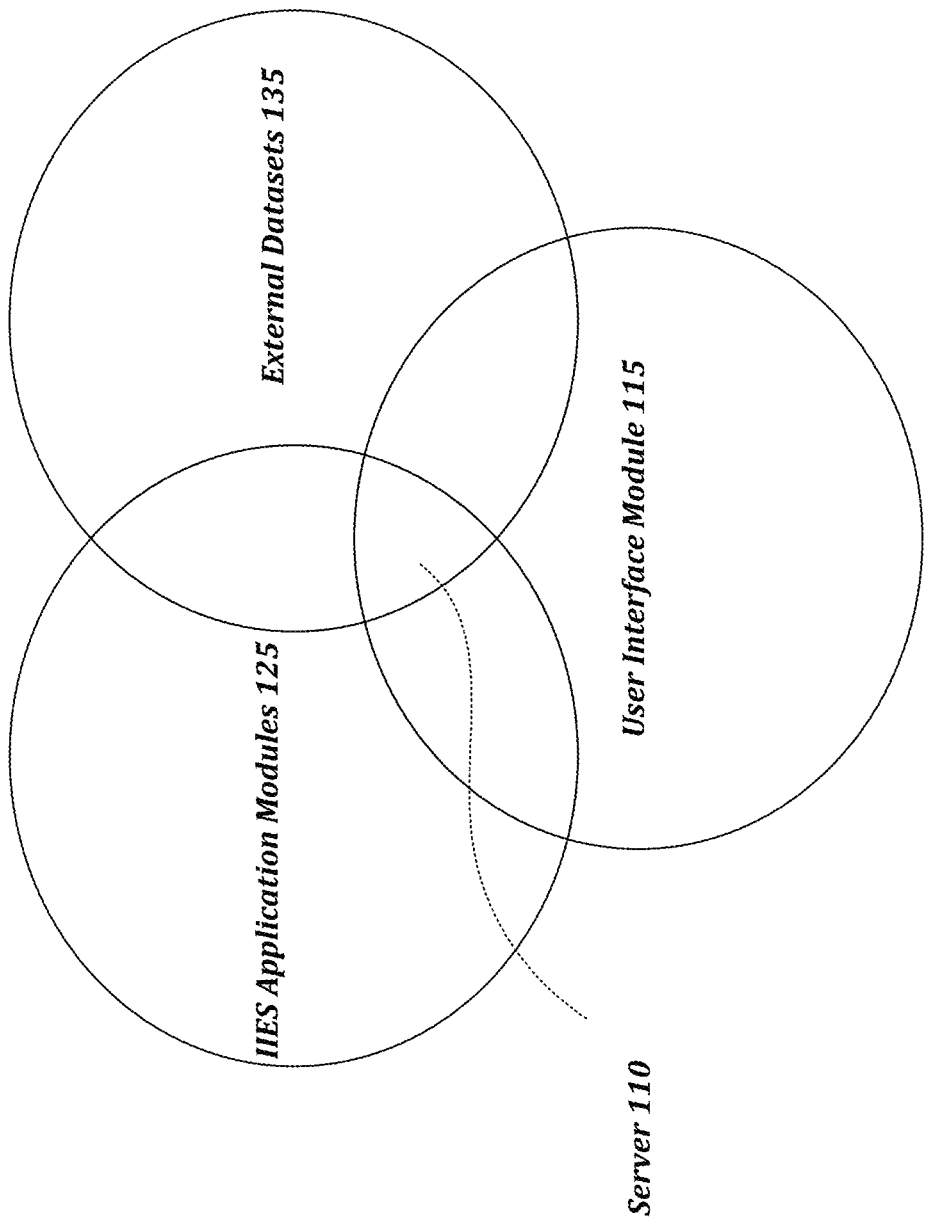
FIG. 1B illustrates a Venn Diagram illustrating the connections between the various components of the platform.

FIG. 1B illustrates a Venn Diagram illustrating the connections between the various components of the platform.

Figure 1C:
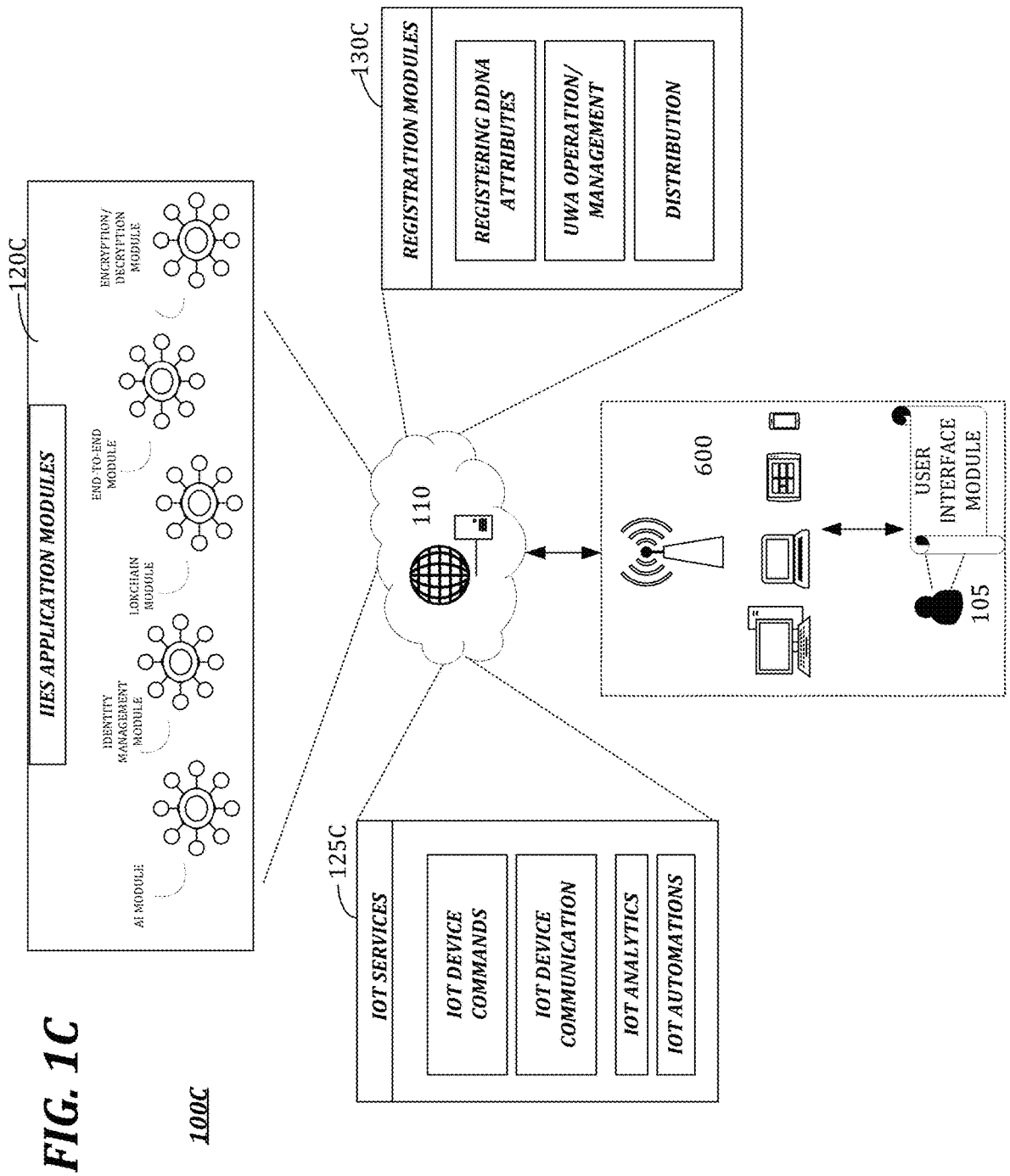
FIG. 1C illustrates a block diagram of an operating environment consistent with the present disclosure.

FIG. 1C illustrates a block diagram of an operating environment consistent with the present disclosure.

Figure 1D:
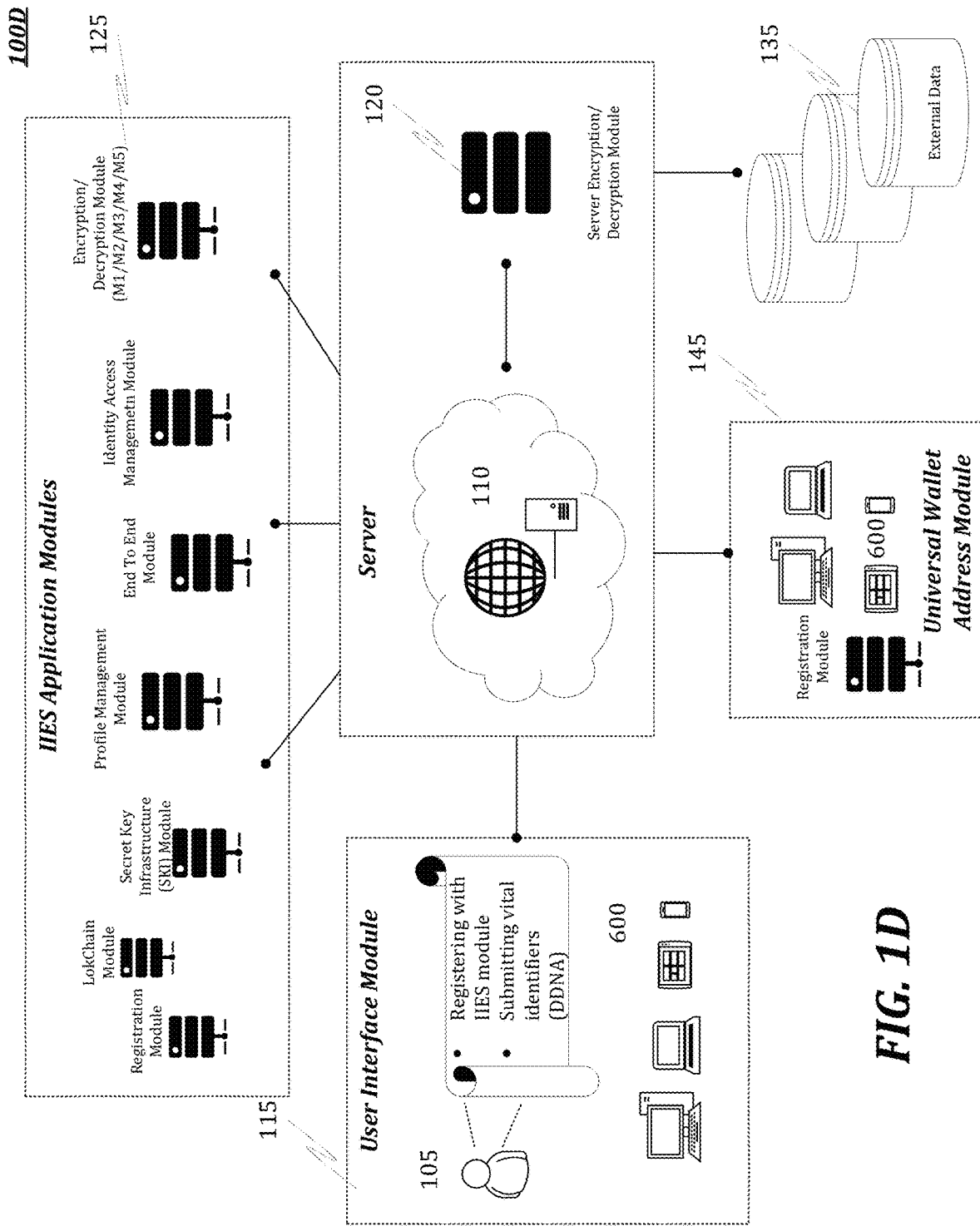
FIG. 1D illustrates a block diagram of an operating environment consistent with the present disclosure.

FIG. 1D illustrates a block diagram of an operating environment consistent with the present disclosure.

Figure 1E:
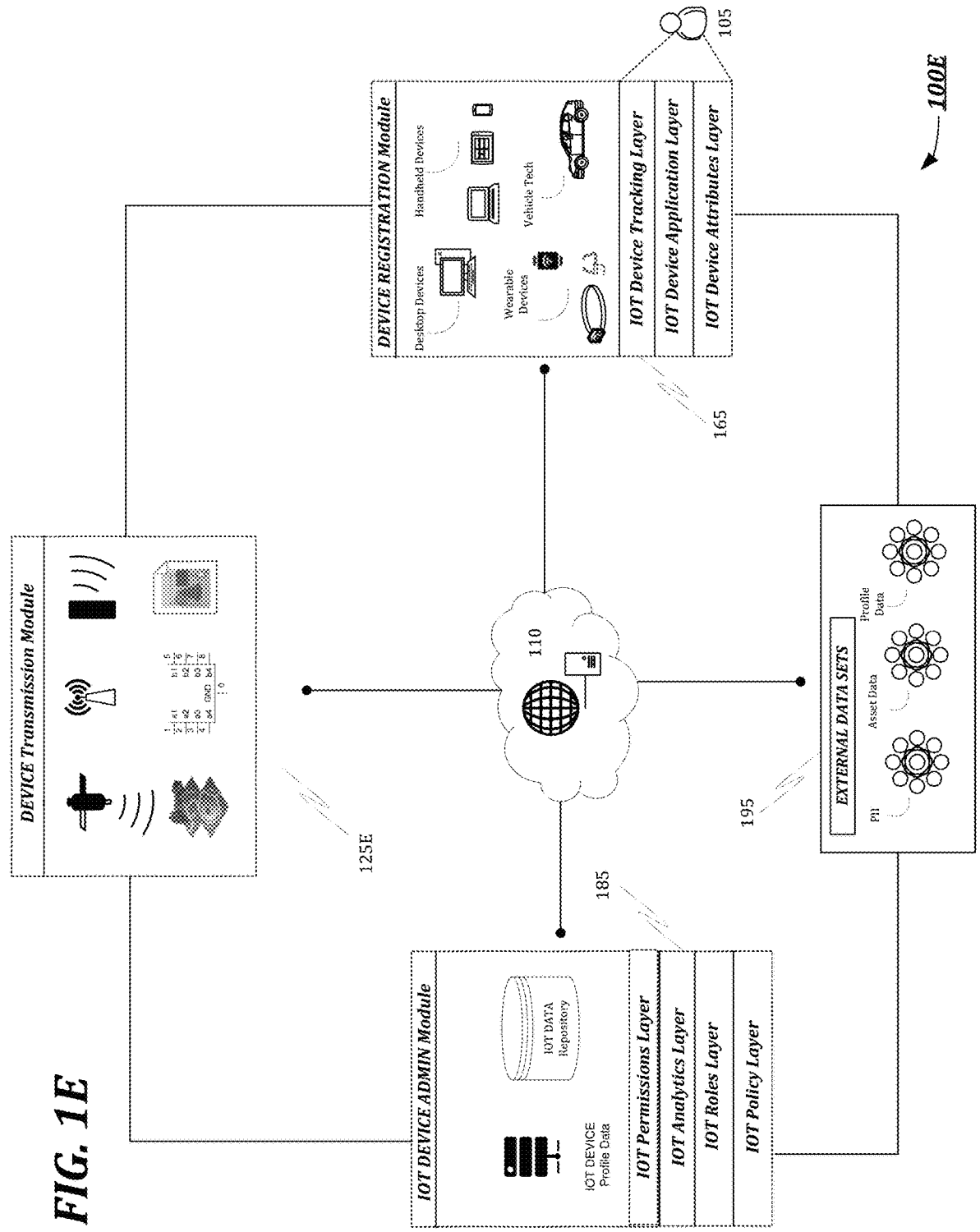
FIG. 1E illustrates a block diagram of an operating environment consistent with the present disclosure.

FIG. 1E illustrates a block diagram of an operating environment consistent with the present disclosure.

Figure 1F:
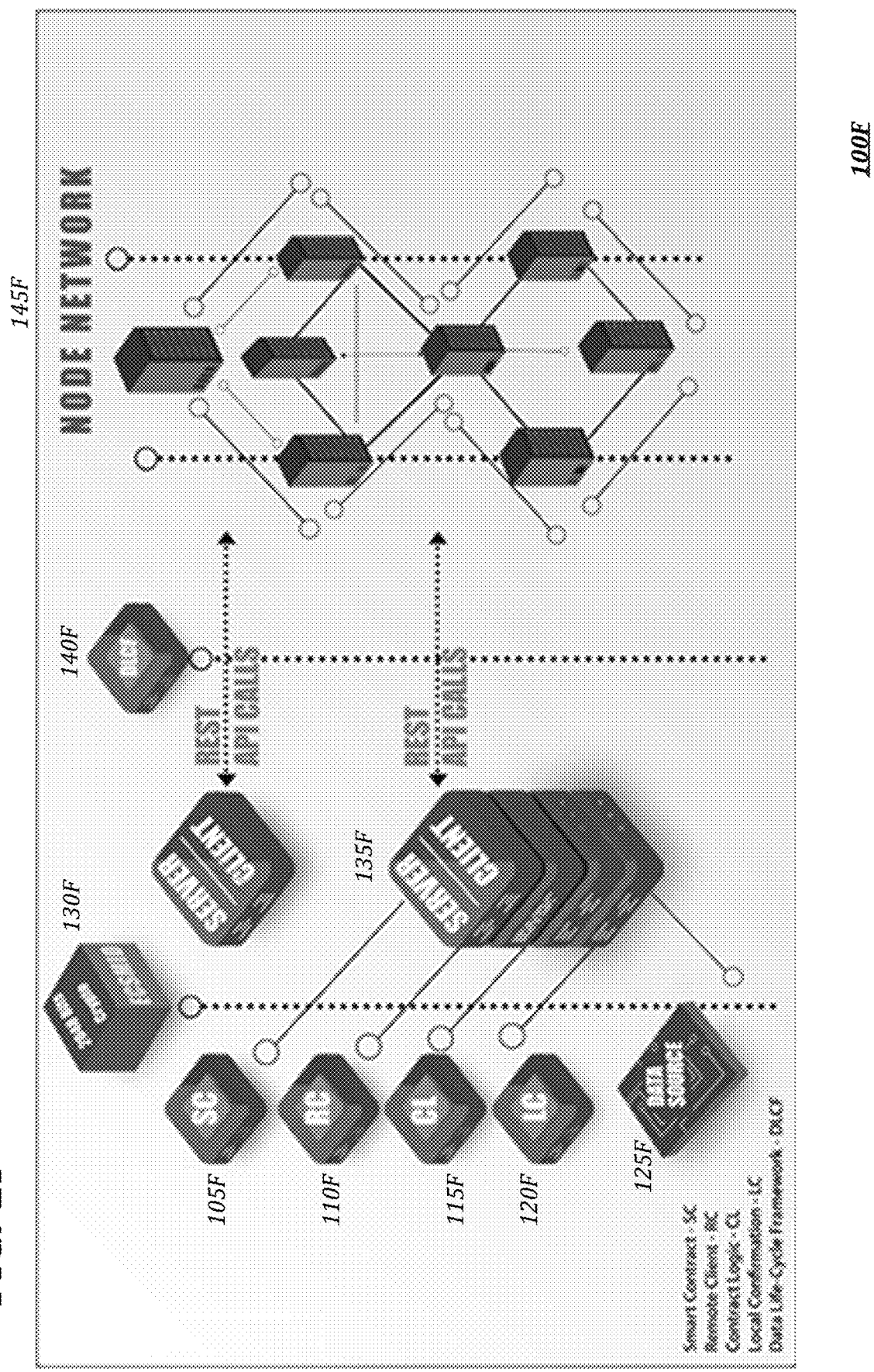
FIG. 1F illustrates a block diagram of an operating environment consistent with the present disclosure.

FIG. 1F illustrates a block diagram of an operating environment consistent with the present disclosure.

Figure 4A:
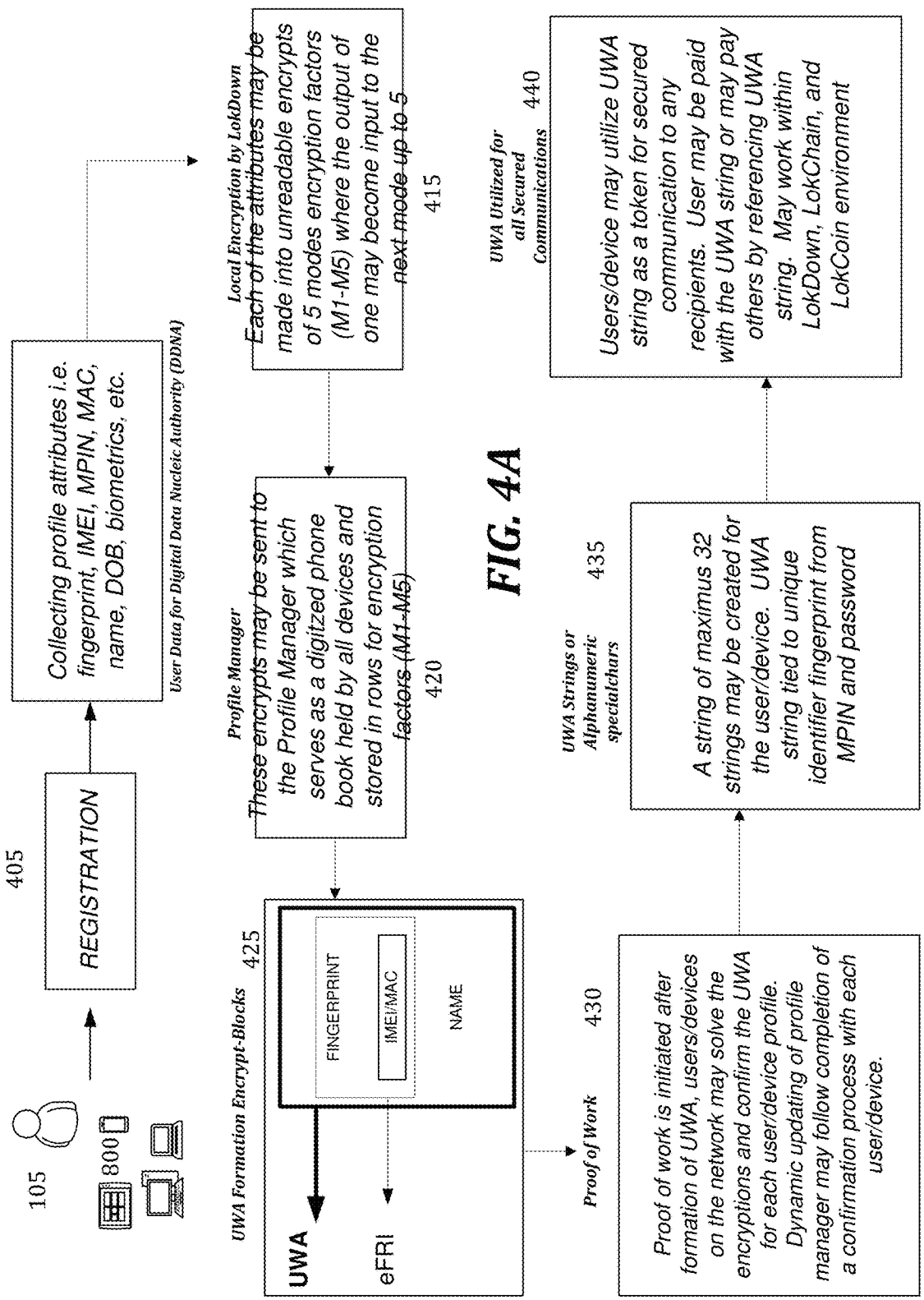
FIG. 4A is a flow chart of a method for providing a Universal Wallet Address (UWA) system within the Industrial Internet Encryption System (IIES)
Figure 4B:
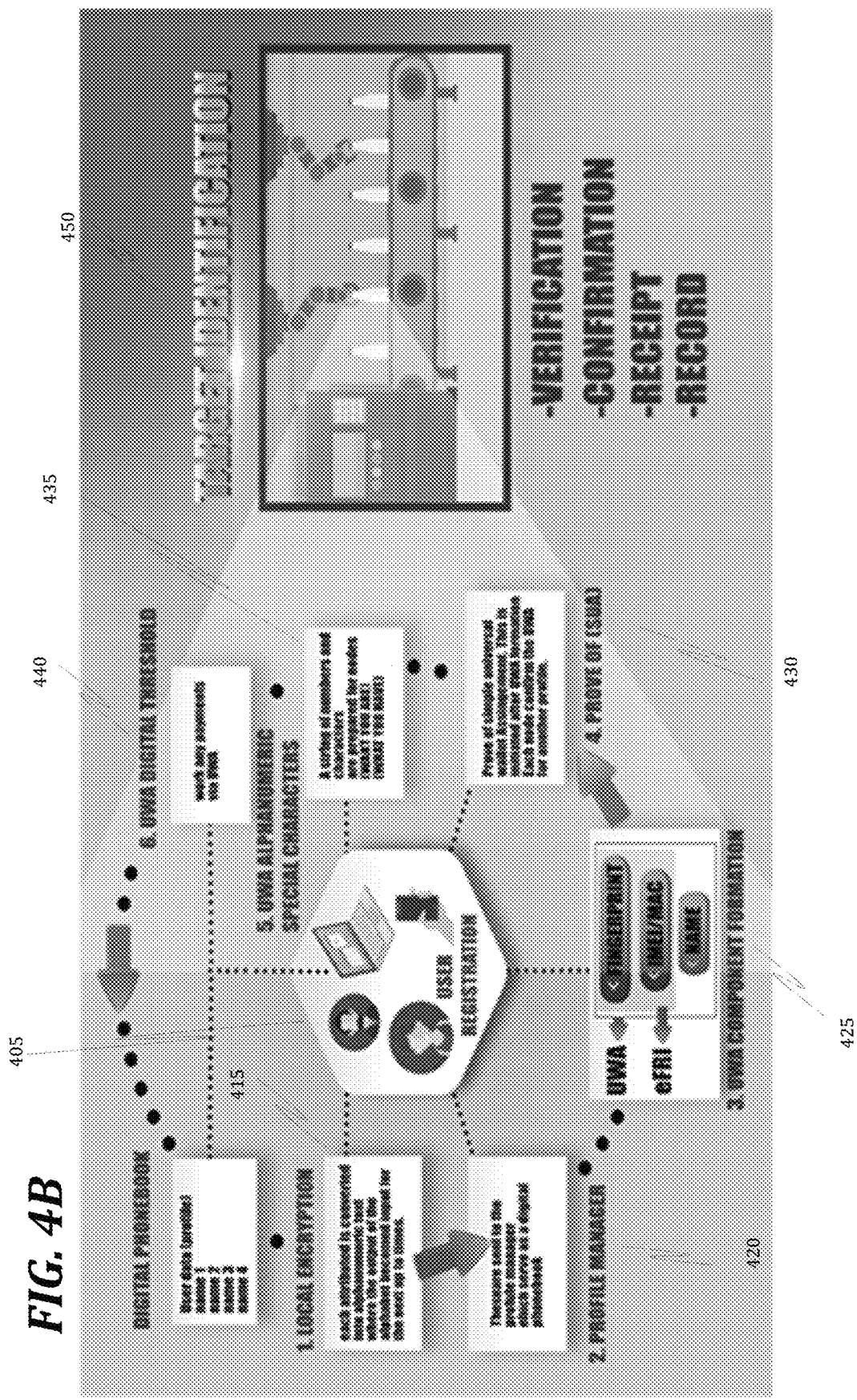
FIG. 4B is a block diagram of an operating environment providing a Universal Wallet Address (UWA) system within the Industrial Internet Encryption System (IIES)

FIG. 4B is a block diagram of an operating environment providing a Universal Wallet Address (UWA) system within the Industrial Internet Encryption System (IIES).

Figure 5A:
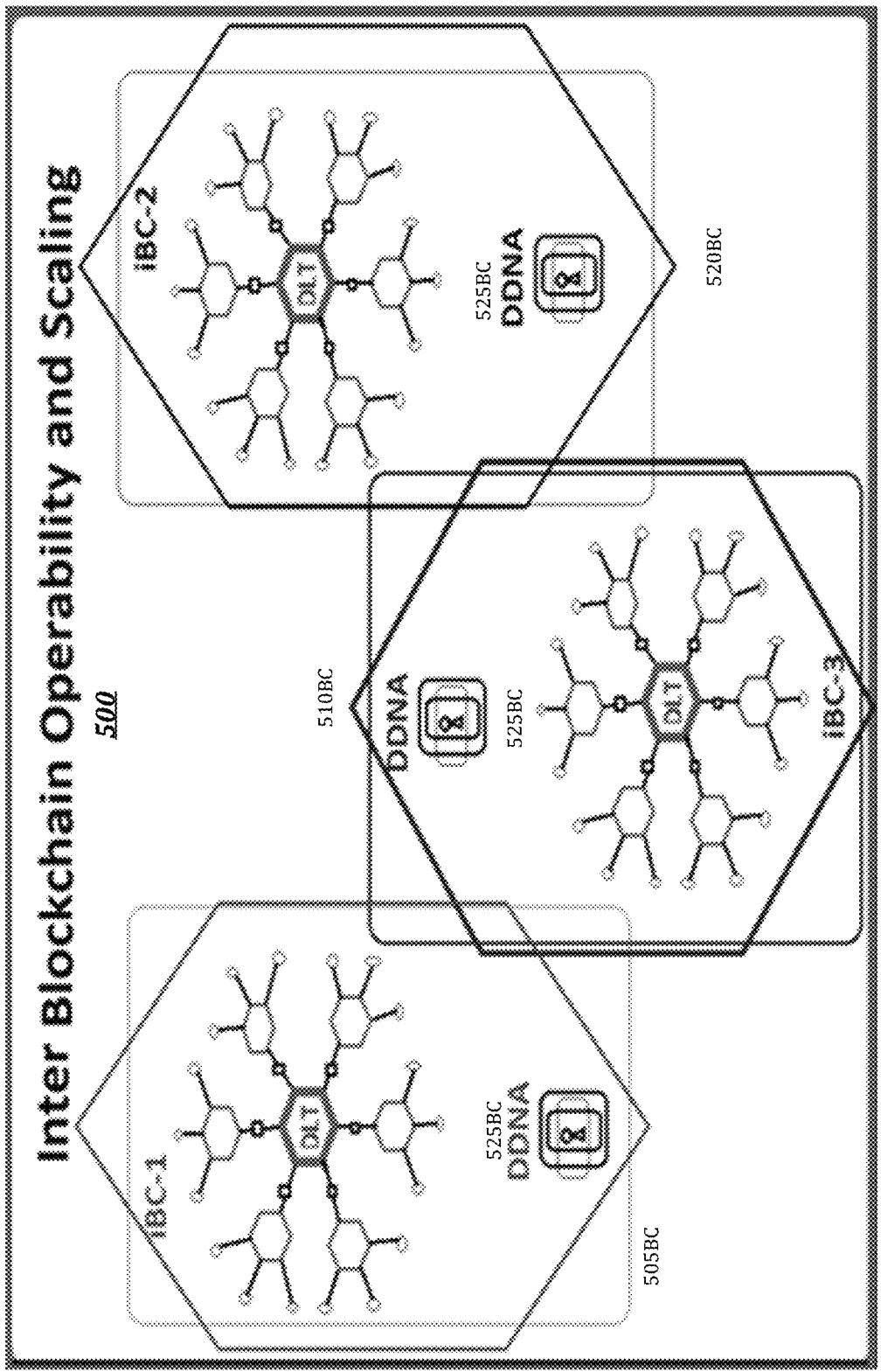
FIG. 5A illustrates a block diagram of an operating environment for the LokChain Module consistent with the present disclosure.

FIG. 5A illustrates a block diagram of an operating environment for the LokChain Module consistent with the present disclosure.

Figure 5B:
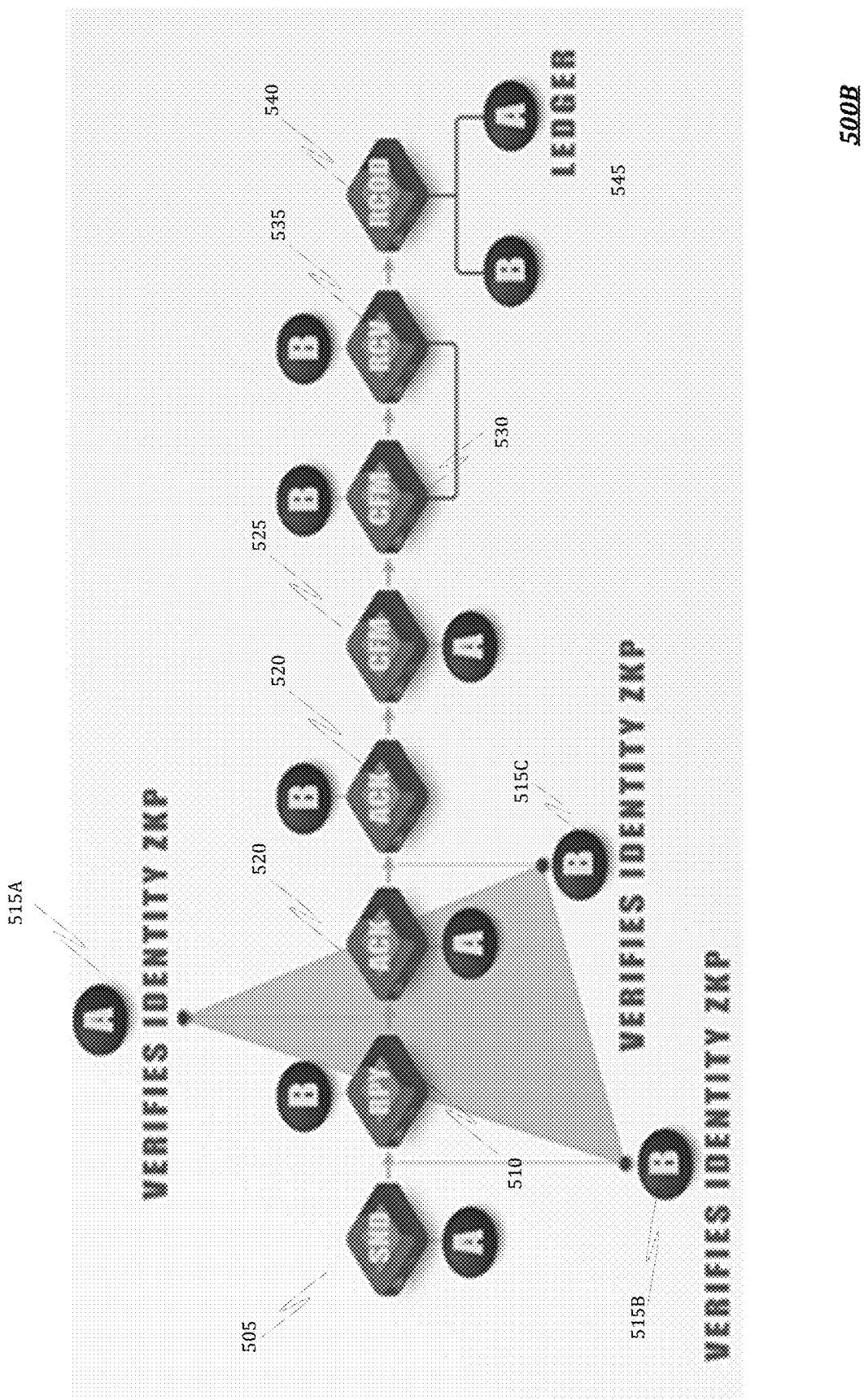
FIG. 5B illustrates a block diagram of an operating environment consistent with the present disclosure.

FIG. 5B illustrates a block diagram of an operating environment consistent with the present disclosure.

Figure 6:
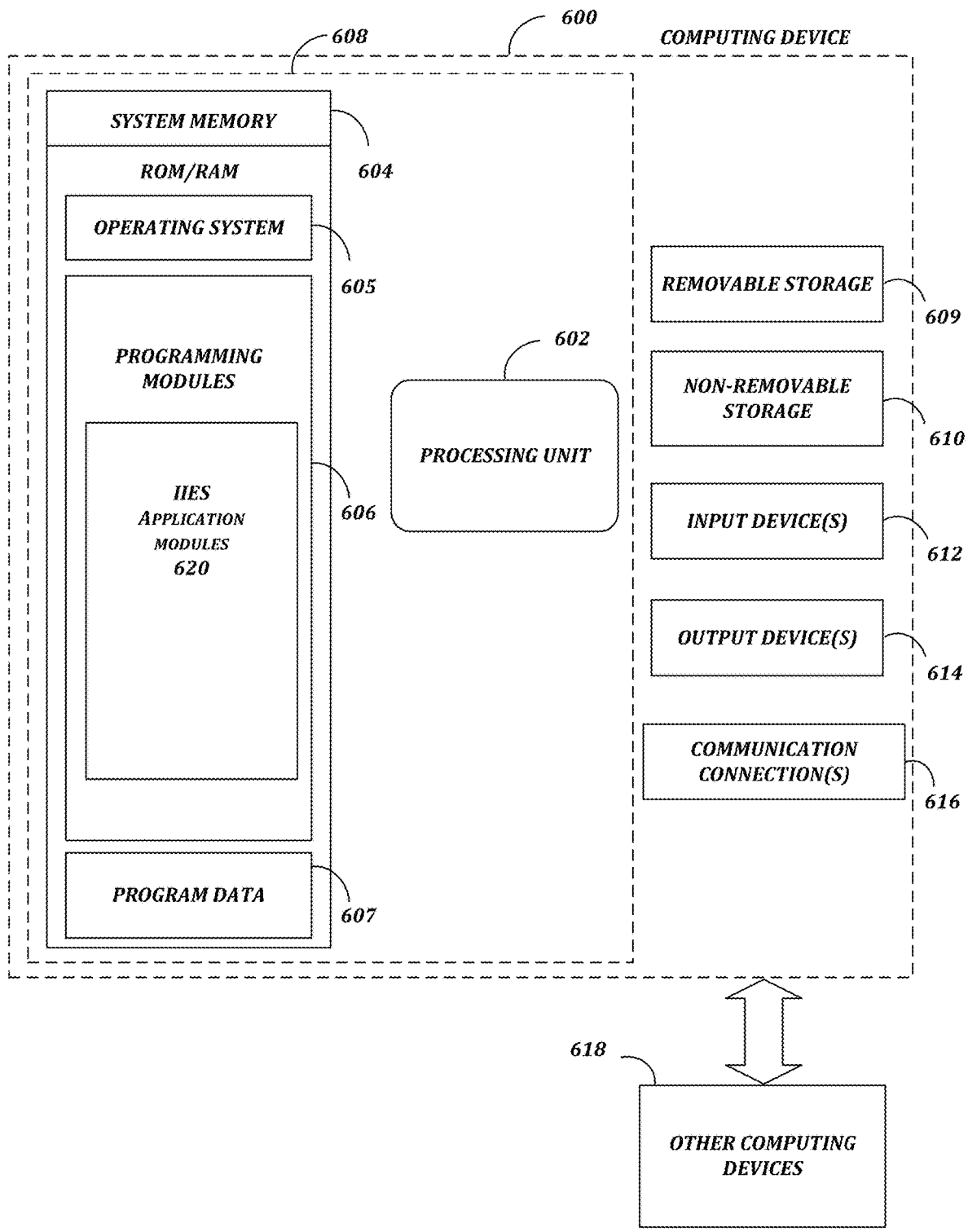
FIG. 6 is a block diagram of a system including a computing device for performing the method of FIG. 6.

FIG. 6 is a block diagram of a system including a computing device for performing the method of FIG. 6.

Figure 7:
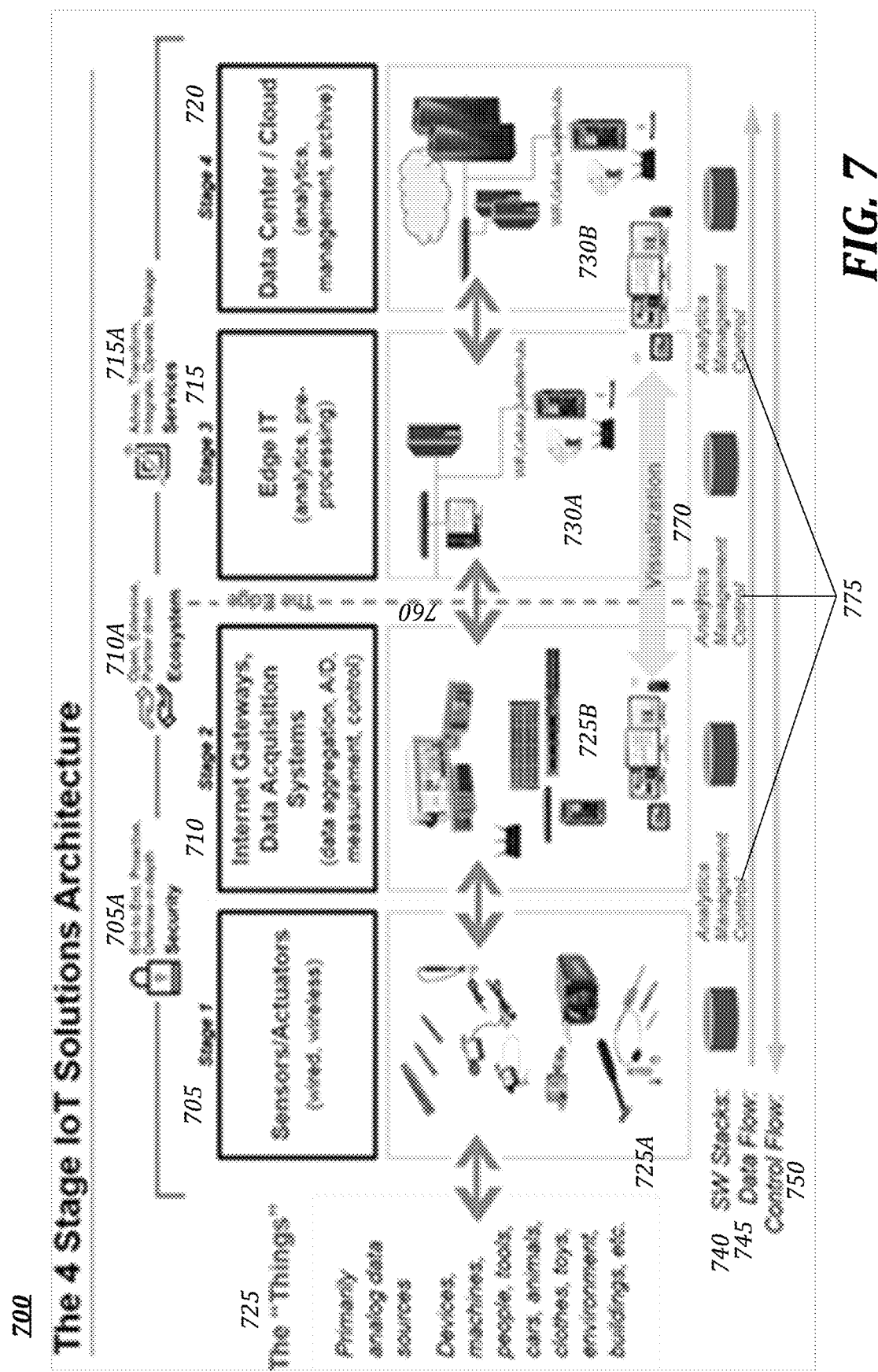
FIG. 7 is a flow diagram of a LokChain method of verification within the Industrial Internet Encryption System (IIES)

FIG. 7 is a block diagram of a LokChain method of verification within the Industrial Internet Encryption System (IIES).

Figure 8:
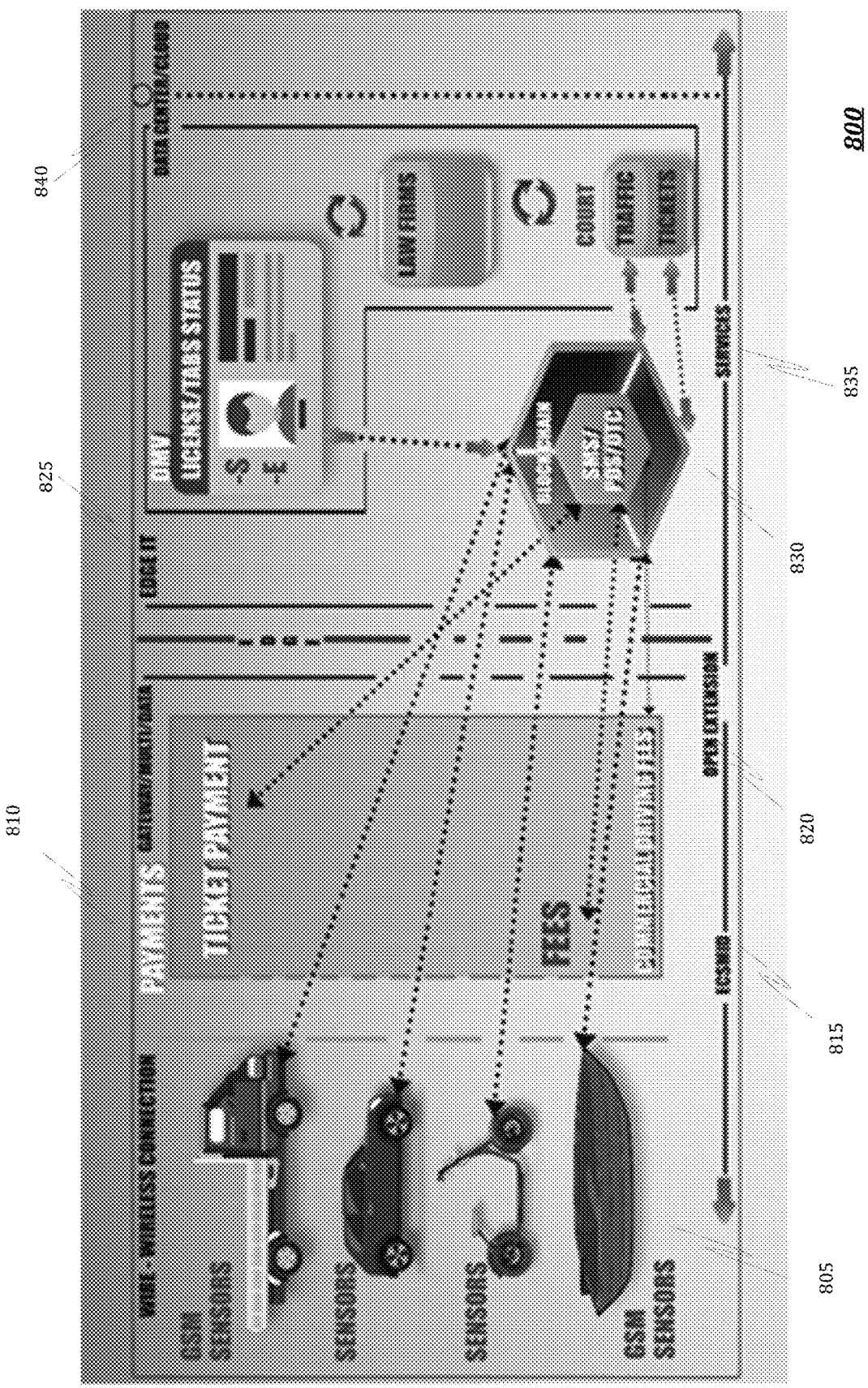
FIG. 8 illustrates a block diagram of an operating environment consistent with the present disclosure.
Figure 10:
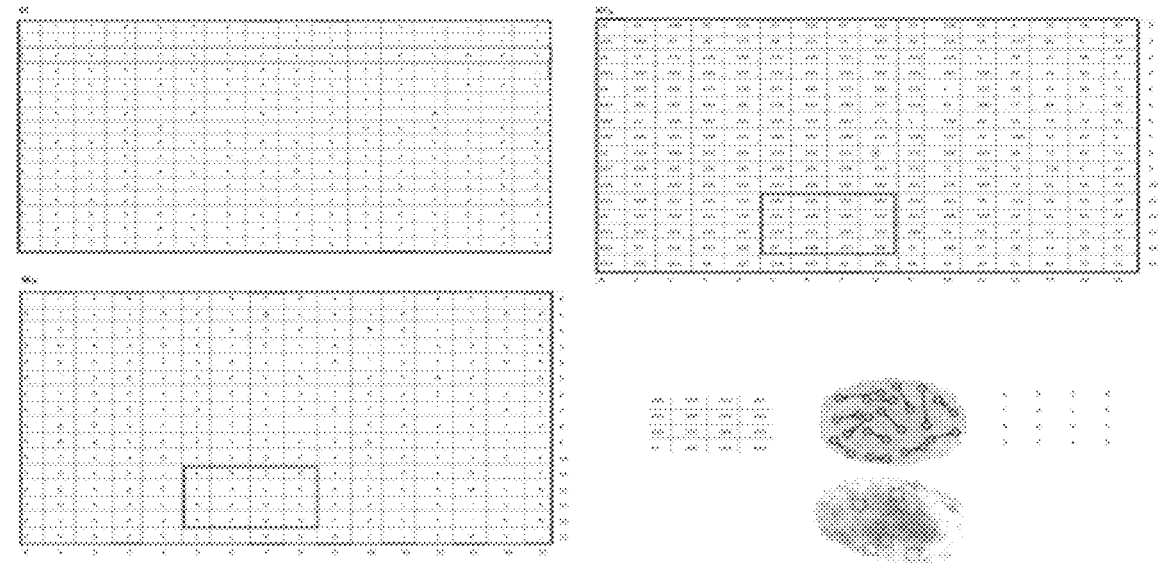
FIG. 10 Encryption/decryption components and eFRI components FIG. Table 1.1a, eFRI String Derivation mechanism FIG. Table 1.1b FIG. 11 Table 2, Table 3
Figure 10:
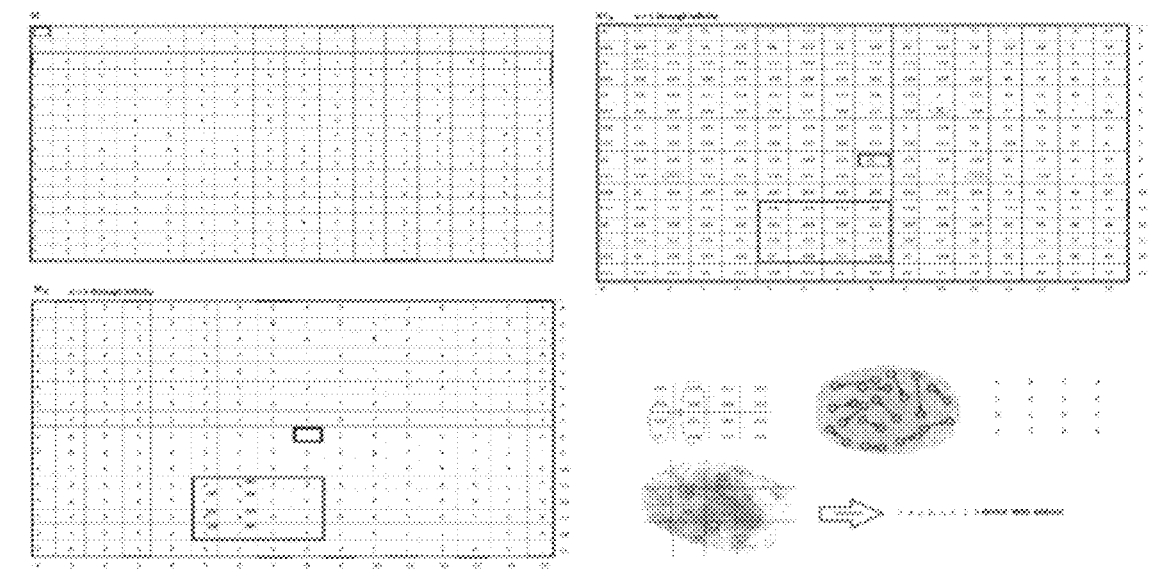
Figure 11:
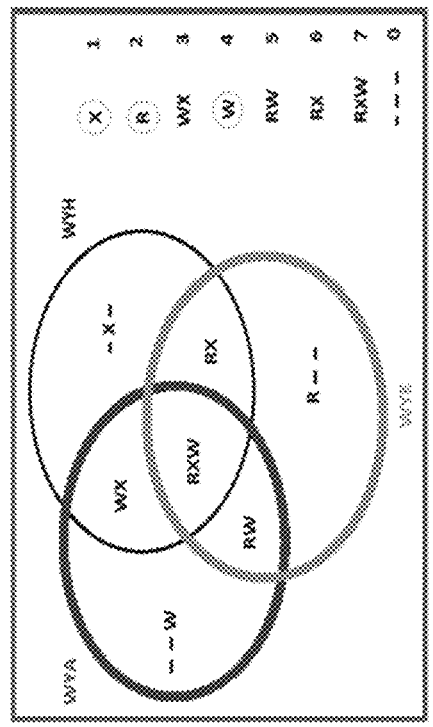

FIG. 8 illustrates a block diagram of an operating environment consistent with the present disclosure.

Regarding the LokChain (LC) Platform, it may be described as a structured web of interconnecting technologies focused on integrating a distributed ledger, mobile device technology and internet of things (IoT) device technology into one cryptographically secure ecosystem. In one aspect, the Lokchain (LC) platform may include a serverless operating system with both public, private and consortium distributed ledgers. In another aspect, the Lokchain (LC) may provide a Secret Key Infrastructure (SKI) that may be configured to deliver quantum computing immunity for small scale users, enterprises, decentralized applications, and internet of things (IoT). Lokchain comprises technological improvements NEM (Smart Asset), Hashgraph (Gossip protocol, a-BFT), IoTA (Local consensus) and ECSMID (benevolent Cryptography; 2048 bits encryption derived from AES), and has successfully resolved over 16 problems identified in the current blockchain space. The Lokchain platform may provide for a highly profitable inter-blockchain, mobile-to-mobile (Mo2Mo), IoT-to-Mobile (I2M), Mobile-to-IoT (M2I), IoT-to-IoT (I2I), IoT-to-IoT to Cloud security infrastructure which does not rely on any third-party, vendor or server.

Regarding the Lokchain platform, in one embodiment, the Lokchain platform may be adapted to carry tokens in its cryptographic wallet. In other aspects, the LokChain platform may be configured to:

a. determine secure keys for governance based on roles, permissions derived, and from combination of physiological and behavioral pattern wherein the combination of physiological and behavioral pattern is data nucleus aggregated information (DNA) or digital data nucleic authority (DDNA)

b. Turn Internet of Things (IoT) devices into secure autonomous blockchain entities of things of values.

c. Turn rural economies and manufacturing into the most secure transactions for wealth creation.

d. Turn blockchain ICO into media of building infrastructural projects in emerging markets.

e. Turn the world' largest business incubator into an innovation complex for Industrie 4.0

1. A computer readable medium comprising, but not limited to, at least one of the following:
   I. A CRM module;
   II. An Industrial Internet Encryption System Application module;
   III. A Registration module;
   IV. A Profile Management module; and
   V. A Universal Wallet Address (UWA) module.

Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each stage in the claim language can be considered independently without the context of the other stages. Each stage may contain language defined in other portions of this specifications. Each stage disclosed for one module may be mixed with the operational stages of another module. Each stage can be claimed on its own and/or interchangeably with other stages of other modules. The following claims will detail the operation of each module, and inter-operation between modules.

Various hardware components may be used at the various stages of operations follow the method and computer-readable medium claims. For example, although the methods have been described to be performed by a computing device, it should be understood that, in some embodiments, different operations may be performed by different networked elements in operative communication with the computing device. For example, server 110 and/or computing device 600 may be employed in the performance of some or all of the stages disclosed with regard to the methods claimed below. Similarly, apparatus 105 may be employed in the performance of some or all of the stages of the methods. As such, apparatus 105 may comprise at least those architectural components as found in computing device 600.

Although the stages are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

Finally, the claims are not structured in the same way non-provisional claims are structured. For example, indentations indicate optional/dependent elements of a parent element.

2. The computer-readable medium of claim 1, further comprising a set of instructions which when executed are configured to enable a method comprising:

1. A method for providing an industrial internet encryption system comprising:
   accessing an application module;
   initiating registration with the application module;
   completing registration with the application module by providing profile attributes;
   locally encrypting registration profile attributes;
   authenticating into a networked environment using encrypted registration information; and
   maintaining registration information for one or more devices.

2. The method of claim 1, further comprising wherein the profile attributes are at least one of: a fingerprint, a name, a media access control (MAC) address, an international mobile equipment identity (IMEI) number, a password, a cellular phone number, an address, a date of birth, a driver's license, an email address, a username, data nucleus aggregated information (DNA), digital data nucleic authority (DDNA) information, and other personally identifiable information.

3. The method of stage 2 further comprising wherein the encrypted registration profile attributes is at least one of data nucleus aggregated information (DNA) and digital data nucleic authority (DDNA) information.

4. The method of stage 1, further comprising wherein the networked environment is at least one of a personal area network (PAN), a local area network (LAN), and other network.

5. The method of stage 1, wherein locally encrypting registration profile attributes further comprises five encryption factors including M1, M2, M3, M4, and M5.

6. The method of stage 1, further comprising:
   hosting, by a profile manager, profile attributes;
   sending, by the profile manager, an encryption factor to all requestors;
   identifying authenticated users based on an encryption factor; and
   assigning roles and groups to one or more authenticated users.

7. The method of stage 6, further comprising wherein the one or more authenticated users includes one or more of: mobile devices, industrial devices, artificial intelligence devices, personal computers, and in Internet of Things (IoT) devices.

8. The method of stage 6, further comprising:
   setting one or more policies for one or more devices;
   establishing permissions for one or more devices;
   assigning roles for one or more devices; and
   maintaining profile information for one or more devices.

9. The method of stage 6, further comprising:
   identifying available recipient devices based on profile attributes;
   establishing communication with one or more available recipient devices; and
   sending encrypted messages to one or more available recipient devices.

10. The method of stage 9, further comprising:
    receiving, by one or more recipient devices, one or more encrypted messages;
    decrypting, by one or more recipient devices, encryption information;
    comparing, by one or more recipient devices, encryption information for validation and verification; and
    validating and verifying encryption information.

11. The method of stage 10, further comprising:
    fully decrypting, by one or more recipient devices, received encrypted message when validation and verification is successful;
    analyzing, by one or more recipient devices, message data;
    determining, by one or more recipient devices, whether response is required;
    encrypting data necessary for response; and
    sending, by one or more recipient devices, response.

12. A method, comprising:
    registering, by a user, a profile;
    collecting profile attributes wherein profile attributes comprise: fingerprint, international mobile equipment identity (IMEI), an encryption code, media access control (MAC) address, name, driver's license, date of birth, biometric data;
    locally encrypting collected profile attribute information;
    sending locally encrypted data to a profile manager;
    forming a universal wallet address system using encrypted collected profile attribute information;

validating and confirming encrypted collected profile attribute information based on one or more encryption factors including M1, M2, M3, M4, and M5; and dynamically updating a profile manager all device information based on completion of the validation and confirmation.

13. The method of stage 9, further comprising:

establishing a secret key infrastructure between one or more endpoint devices.

14. The method of stage 9, further comprising:

establishing a unique identifier fingerprint from an encryption code and password;

creating alpha numeric strings for device identification;

tying, the alpha numeric strings to the unique identifier fingerprint; and utilizing the alpha numeric string as a token for secured communication between identified devices.

15. The method of stage 14, wherein creating alpha numeric strings for device identification further comprises creating a maximum of 32 strings for each one or more devices.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. Platform Configuration

FIG. 1 illustrates one possible operating environment through which a platform consistent with embodiments of the present disclosure may be provided. By way of non-limiting example, a Industrial Internet Encryption System (IIES) platform 100 may be hosted on a centralized server 110, such as, for example, a cloud computing service. A user 105 may access platform 100 through a software application. The software application may be embodied as, for example, but not be limited to, a website, a web application, a desktop application, and a mobile application compatible with a computing device 600. One possible embodiment of the software application may be provided by the IIES™ or LokChain™ or End to End Encryption™ suite of products and services provided by the Industrial Internet Encryption System (IIES) company or corporate actor.

As will be detailed with reference to FIG. 6 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

FIGS. 1A, 1B, 1C, 1D, 1E, and 1F illustrate non-limiting examples of operating environments for the aforementioned modules. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each stage in the claim language can be considered independently without the context of the other stages. Each stage may contain language defined in other portions of this specifications. Each stage disclosed for one module may be mixed with the operational stages of another module. Each stage can be claimed on its own and/or interchangeably with other stages of other modules.

The Lokchain Module Technology

LockChain is essentially a Distributed Ledger system for eTransactions that uses Lokdon encryption technology with five modes of encrypts to secure sharing of encrypted file and texts using string-like offsets which contains encrypted personal data for verification, validation and authentication. Cryptographically this secures all transactions in the digital world. It converts the plaint text or files into cipher text or cipher files with permission to share once the receiver's mode 3 encrypt is verified plus the sender's propped validation of mode 2 offset is confirmed. It does away with PKI, Hashing, Public and Private keys schemes by using simple encryption system (LokDon) which relies on 2048-bit keys or 680-character long keys. These keys are generated on the go without being saved anywhere on the hard disk. This crypto is agnostic to protocols. It can conveniently be used in pipelines as unsecured as Telnet, HTTP, FTP etc.

Uses in practice

In practice, the system uses a 'Matryoshka' doll ensemble called five (5) mode chain encrypt. This establishes a mechanism where all communications are encrypted. An output in one level becomes an input in the next level of the chain. This is true for all encryption performed with LokDon. Senders and receivers must verify and validate user's information before decrypting any message. During registration all the information (including finger prints) put in by user are saved as blobs in the server with ciphered encrypt to reference these blobs. See the highlights of the system below:

1. Core modules:

Key Generator (256 characters)

Standard State

Knight tour solution.

Encryptor

Decryptor

2. Practical logic for devices:

New device procedure

PIN and Password procedure

Pass and PIN initialization method

Data encryption mechanism

The usually will start by reading the file to binary encode to base 64: The is then encrypted 3. Fintech-Ledger a. Profile Verifiable b. Ledger Attributes 4. Lokchain mechanism (Read up on https://github.com/aflin/aescrypt.js) See related disclosure document cited in related applications Knight tour solution template FIG. 0.1.0

See related disclosure document cited in related applications

Layout of the ST, $KT_n$ and $M_n$ FIG. 0.1.1

See related disclosure document cited in related applications

Mapping of ST to $KT_{n=1}$ to produce $M_1$ FIG. 0.1.2

Mapping of ST to $KT_{n=2}$ to produce $M_2$ FIG. 0.1.2C $SL-M_{n=1}$ implementation FIG. 0.1.2d See related disclosure document cited in related applications 1) Set up ST and Reverse ST 2) Generate 5 random number between 0 to 255 (Ex 2,5,10,53,189) for Knight Tour' Template (KT) so we can get the M1, M2, M3, M4, . . . M5.

3) Generate an even KT position between 0 to 255 and map reverse ST to it; this will enable you to create SL-M$_1$: The reason for this is to generate random chars or password or phrase that can be shared in a subtle way.
4) Find and use equal in length random characters from SL-M$_1$ to be ORed with the original plain text (msg_file) length: All characters of the silent password could possibly find a match with any single character in the original msg_file (plain text) bin/hex. However, those characters cannot repeat in the string of silent password.
5) Add message numerical values to the random character (bin/hex) following each layer or specific Cipher template arrangement in M$_n$ matrix (M$_1$-M$_5$): If the sum of original message and the silent password is greater than the scope (which in this case is 256) then subtract 256 from the numbers representing the new values. Let's demonstrate the encryption using the cryptographic engine for encryption. Hypothetically, say we have the original msg_file or plaintext as "helli". All chars are represented by their index with respect to each relevant mode as in M$_1$; SL-M$_1$ when SL-M$_6$ is not available since it could be daunting to display all matrices for the modes; the first cipher template (CT$_1$) in M1-M5 modes.

Msg_file h e l l i
172 218 61 61 141
SLpswmsg.length o d 0 Q W
146 6 8 48 50$_{(Taken\ from\ SL-M1)}$
(SLpsw+msg_file) 318 226 69 109 191
−256
62 226 69 109 191
Ciphered msg_file: q ü ă · *
Now take these values "qüă*" as an input for M$_2$ mode encryption. This increased the complexity as it brings about the "matryoshka" doll effect.

M2: All char are represented by their index in the context of this mode.
Msg_file q ü ă · *
225 79 134 29 25
SLpswmsg.length o d 0 Q W
146 6 8 48 50 we keep the same VALUES from SL-M$_1$
(This is to keep the characters in the context of SL-M mode.)
(SLpsw+msg_file) 371 85 142 77 75
256
115 85 142 77 75
Ciphered msg_file: x ½ Ó đ IJ
As you can see all the characters guaranteed are designed to be different. This will stand against frequency attacks or pattern recognition. The process can continue to M5.
6) The final stage of encryption is in M$_5$: We use the numbers from modulo addition to find the matching index in M$_5$ and take the corresponding values. These values represent our ENCRYPTED message/password.
7) You will send the final offset below to the recipient or any server:
a. Components of the ciphered password string:
M5 (msg_file cipher output from M5)^SL-M$_1$(silent password i.e random character)^Knight Tour (Ex 2,5,10,53, 189)^SL-M$_1$(indices)
b. sample value: gtdhp ^*3%#$ ^12,13,14,15,16 ^22
This is the kind of offset for the message sent out to the recipient. All the characters are alternated and given number or other characters. Since we ended the with M$_2$ position we will have this cipher text instead of M$_5$:

M$_2$ (password cipher output from M$_2$)^SL-M$_6$(silent password i.e random character)^Knight our (Ex 2,5,10, 53,189)^SL-M6(indices)
b. Actual value: x½Ó$^{dIJ}$od0QW ^136,162 ^136r (This is actual to the KT$_n$ and M$_n$ used in this case)
Go back to SL-M1 (It is used as SL-M6) change the numbers to their corresponding characters there; following the mapping process. Even if the message is not a password we can send it in this format as well:
x½ Ó$^{dIJ}$od0QW$^{\hat{C}}$v$^{\hat{C}}$r
If the message is a password: Alternating the positions of the raw characters is ideal. Recommendation it to take the rightmost bytes (chars) and placing in the leftmost positions skip the next position and continue: This is the final password that is sent to the recipient.
rx$^{\hat{C}}$½ vÓ$^{\hat{C}d}$W$^{IJ}$Qo0d Crypto Application to Financial Ledger:
A ledger is created used the crypto protocol described above in the cloud or on any node (for example spreadsheet for finance etc). This could also be on a backend server. We will implement password and MPIN encrypt method (m$_1$-m$_5$) to access the ledger.
Since we keep profiles, we can track users as well as details of access and transactions. If files need to be moved, they are encrypted first.
The ledger will self-encrypt and will have its own engine holding verifiable attributes. It's that simple:
1. We maintain a ledger profile for all users.
If users want to access and modify files. We will invoke this next process:
2. Send request for access via login and insert MPIN (m$_1$-m$_5$ encrypt).
3. Ledger object verifies the user profile by:
4. Checking if the attributes are present. Decrypting the m$_5$ encrypt to m$_4$. Then, comparing it to ledger' user profiles (also decrypting the m$_5$ held here too). If the profiles match, you gain access to ledger.
5. Upon ending a transaction, the ledger will self-encrypt. This means the whole ledger is encrypted at rest after each profile session (sections are IDed).
6. For future access the ledger sends m$_4$ with the original user m$_5$ encrypt sent initially: before ledger' self-encryption. The idea is for users to decrypt the ledger' encrypt to m$_3$. If a user does that great. They will send m3 encrypt back to ledger as well as their own m$_4$ encrypt.
7. In the node or backend. The ledger will decrypt these to m$_2$ and m$_3$ encrypt following order in #6 If the results matches with what the ledger holds for that profile: This means ledger will decrypt files for the user. If this is implemented the right way blockchain will be shaken since it is still based on public key infrastructure.

Current LokChain Architecture Blocks
  LockChain Architecture Blocks. FIG. 0.1.2E See related disclosure document cited in related applications
Now that we have developed the crypto process let's address other aspects of a full-blown development of the platform desired. We will like the Platform to have the following:
  1. User Profile manager
    This refers to the verifiable attributes which links the user and a specific profile.
    i. Pin encrypt
    ii. Password encrypt
    iii. Username
    iv. Official Name/company name
    v. Email/Official email
    vi. Location Addr
    vii. DOB viii. FEIN
ix. Cell or mobile number
x. IMEI
xi. eFRI
2. Instrument manager
   This refers to the kind of currency used.
   i. LokCoin
   ii. Other colored coin
   iii. CreditCard
3. Protocol manager
   This will refer to the protocol used to negotiate the transaction step by step.
   i. Lokdon encryption/decryption for Payments
   ii. Lokdon encryption/decryption for Refund
   iii. Lokdon encryption/decryption for Gift
4. User Interface for vendors, clients and financial institutions
   This refers to the interface which makes the process easy, transparent and visible to users.
   i. Nice skin
5. LokChain wallet Controller
   This refers to the integration of 1, 2, 3, 4 blocks of the process for any user with a vetted profile. It is imperative to understand that during registration a profile of attributes and a universal wallet (alphanumeric string) is created.
6. Communication/Transaction manager
   This is built on connection abstraction to support remote connection which brings the idea of session to life. The session is between a wallet and another node (message, response). This could be quite asynchronous. Thus, it creates a request (over http) and response (using TCP/IP) over ethernet network. This makes for accountability and manages all transactions (including unsuccessful transactions): In-bound and out-bound the wallet calls, with reference given to the individual's wallet object, else does not apply.

The diagram is a narrative of protocol of the actions we can perform from A to Z. The attributes are very important since the method will not work without a proper profile management. We need to choose an instrument (cash, credit card, Lokcoin) therefore we need the instrument manager to decide on the instrument of transaction. We also need to follow a step by step process to carry out the actions needed to transact. This we can achieve by engaging the protocol manager: It makes certain that the proper protocol is followed accordingly. UI only makes the users life easier when using the application or software. LokCoin wallet controller is the backbone of the payment system here in. It integrates all the manager's and their objects (classes) presents and logs any change in balance, profile and transactions.

LockChain mechanism and flow. FIG. 0.1.2F See related disclosure document cited in related applications Double Spending Issue In a world where nations states have failed to backup the currency with gold as it was done from the dawn of human civilization. We have deduced that the fiat money produces inflation and destroys the hard-work of an ordinary man with the frequent bubble burst in every decade or so. It is quite novel for all to base their currency on whatever natural resources or commodity they see viable and profitable to them. This can be converted to digital currency to further ease the movement of money devoid greedy third-parties. We believe that Lincoin is built on lokdon technology, we can take advantage of this need but first we must solve the problem of double spending. This we can do without hashing: Lokdon has an inbuilt system that guarantees uniqueness to all digital objects. Every instance of any object in the managers are unique without hash in the mix.

LockChain double spending mechanism. FIG. 0.1.2G See related disclosure document cited in related applications Every user has a profile built by attributes. These attributes bear authorship and are verifiable. Below you can see how the encrypt system supports this uniqueness.

User=Profile e.i every user has a profile. The profile can be held in hardware form (chips-MCU or SoC) or software could be built to host and update these profile for the world-region wise. It will be like a phone book. Very simple if someone wants to talk to you they look you up in the phone book. They obtain the number and call you. If the person goes through the approval process and pass you keep the link if not you hang up and that is that.

The technology can therefore be conveniently applied to Passwords and data exchanged in any electronic transaction. What if we can use the exposure of specific part or module of encrypt to verify or authenticate user and validate CIA of date in question.

. . .
M2
M3
M4
. . .

We are using a wrap-up method in which one layers is wrapped into another layer just like the matryoshka doll ensemble which can exceed 5 modes or M5. In this case strategically chosen remnants are used to control the whole exchange.

MPIN Indexing

This is a special case of the method in question. Here a 4-digit numbers are made into 8 unique characters thru an algo that chooses immediate 2 characters (indices)) to the left or right or up or down of each of the numbers that make up the digits Always remember that this character is retained all through MPIN encryption process. Here in, if the two characters cannot be secured because the scope is limited e.g a number at the end of a row of column. It is the recommended to use the right if the this is not available the try the down thereafter if still not available try the top positions. To demonstrate let's use the PIN=7642→

82 83 100 101 193 194 244 245

MPIN

CT1+silent password=CT2→MPIN m2 encrypt-[cipertext2]^silent password ^[P spkt$_n$][P kt$_n$]M2
CT2+silent password=CT3→MPIN m3 encrypt-[cipertext3]^silent password ^[P spkt$_n$][P kt$_n$]M3
CT3+silent password=CT4→MPIN m4 encrypt-[cipertext4]^silent password ^[P spkt$_n$][P kt$_n$]M4

Password

CT1+silent password=CT2→m2 encrypt-[cipertext2]^silent password ^[P spkt][P kt]M2
CT2+silent password=CT3→m3 encrypt-[cipertext3]^silent password ^[P spkt][P kt]M3
CT3+silent password=CT4→m4 encrypt-[cipertext4]^silent password ^[P spkt][P kt]M4

Data msg+mpin encrypt=CT2→M2 encrypt-[ciphertext2]^[mpinm2 encrypt]^[Pkt]^[P mpinkt]
msg+mpin encrypt=CT3→M3 encrypt-[ciphertext3]^[mpinm2 encrypt]^[Pkt]^[P mpinkt]
msg+mpin encrypt=CT4→M4 encrypt-[ciphertext4]^[mpinm2 encrypt]^[Pkt]^[P mpinkt]

Full M5 mechanism

Password
    password+silent password=CT1→m1 encrypt-[cipertext1]^ silent password ^ [P spkt][P kt]M1
        CT1+silent password=CT2→m2 encrypt-[cipertext2]^silent password ^[P spkt][P kt]M2
        CT2+silent password=CT3→m3 encrypt-[cipertext3]^silent password ^[P spkt][P kt]M3
        CT3+silent password=CT4→m4 encrypt-[cipertext4]^silent password ^[P spkt][P kt]M4
        CT4+silent password=CT5→m5 encrypt-[cipertext5]^silent password ^[P spkt][P kt]M5
Data
    msg+mpin encrypt=CT1→M1 encrypt-[ciphertext1]^[mpinm2 encrypt]^[Pkt]^[P mpinkt]
    msg+mpin encrypt=CT2→M2 encrypt-[ciphertext2]^[mpinm2 encrypt]^[Pkt]^[P mpinkt]
    msg+mpin encrypt=CT3→M3 encrypt-[ciphertext3]^[mpinm2 encrypt]^[Pkt]^[P mpinkt]
    msg+mpin encrypt=CT4→M4 encrypt-[ciphertext4]^[mpinm2 encrypt]^[Pkt]^[P mpinkt]
    msg+mpin encrypt=CT5→M5 encrypt-[ciphertext5]^[mpinm2 encrypt]^[Pkt]^[P mpinkt]
    Let's look at this A wants to send something to B.

Protocol Manger: This will manage the selected protocols chosen based on the circumstance of transactions. We have three protocols to show case.

PROTOCOL Scenario 1.

Let's say that A wants to send $10 to user B. We assume that B and A are in the Lincoin network. We also assume that it's a sales transaction, in that case either one can start the process. It is possible that B can send a notice to collect pay via Lokchain to A. This will serve as a trigger for A to send the $10. So, A will commence by filling out a send-money ticket (ticket will contain verifiable/s) with the amount in question to the Lokchain ledger. Since Lokchain is aware of A it will accept the request and initiate the process to send the money to B. The money will be sent by the ledger engine bearing B m4 encrypt. Why did the ledger send this to B? Once B receives this s/he cannot access the message sent until he is able to reduce the M4 encrypt to M3. B can now decrypt the message read it and complete confirmation money to be sent. B encrypts and sends this confirmation with m3 encrypt (this can be stripped off the position for the hype security paranoia) back to Lokchain. Lokchain compares what was received to the Ciphertext3 in M3 held in its vault. If it matches, Lokchain recognized the user as the right B. The verification process is complete. The question now is there any reason why the money cannot be sent to B? In any case the $10 is credited to A and debited to B in the ledger records are kept the block or folder as headers and metadata with full history.

PROTOCOL Scenario 2

Transaction is not Done Via External Lokchain Engine. However, it is Used to Verify Profiles.

A is on the network and B is not on the network. A sends a message to B using any of these phone number (sms) or email. The message will be to tender $10 payment to B. Of course, B will not understand this at all since it is encrypted. However, a link will be provided to B allowing it to build a Lincoin network profile. B follows the link or url and registers to Lincoin network with all the verifiables intact. Password and MPIN encrypt are built for B. Remember A already has (its own). Lokchain ledger will be referenced for the initial temporary mpin or password for B: This is how B and A can get the handshake. Note A, already had contacted and volunteered some information which enabled the Lokchain ledger engine to create a temporary mpin or password for B. So when B finishes the registration process he will download first the temp.password to read the initial message sent by A. This is how he will learn about the send-money ticket. This is done with B decrypting that message. Now the handshake is broken down-Verification by:

1. Lokchain sending temporary password m4 encrypt with position to A.
2. Then A decrypting this to temporary password m3 encrypt
3. Strips the ciphertext and $KT_n$ indices or positions
4. A, including this stripped out encrypt into that actual encrypted message to be sent.
5. A sending this whole package as the main (ciphertext) out to B
6. B receiving the message and decrypts by first reducing the m3 encrypt to m2 encrypt (stripped).
7. Compares this to that specific field in the download from the server This is how the initial message A sends to B is verified and decrypted. The verification is complete when B reads the ticket and completes the confirmation of pay. After this download another download ensures B will retain a permanent encrypt of it mpin2 (stripped) on the device in question.

PROTOCOL Scenario 3

A and B autonomously hold bank of all profiles and unchangeable copies of lokchain ledger at the time of their Lokchain network membership. That means that their system is lokchain-profile aware plus they have all the historical; the header and metadata information. In this case there is a principle or genesis folder/chain. We assume that there are pervasive and progressive updating mechanism across the nodes. At any point in the chain one or more nodes had the most accurate information. At the possible least one node will always have updated information. Critical part of the ledger is designed to read only. Header and metadata are never modifiable.

Let's say in this case A wants to send $19 to B. A creates a ticket to pay B the $19. This ticket is just a message by the way. However, it also contains along with it, B' Mpin m4 encrypt. B will receive the message but will be unable to read it until he decrypts the m4 encrypt to m3. If this m3 encrypt matches the one held in the profile-vault then B will be able to decrypt the messages. B now decrypts to m3 and finally decrypts the message from A. B now will confirm the amount of pay by allowing the figure or changing it. However, he must make sure that A is the right A. He includes in his encrypted message A's m4 encrypt. Once A gets the message he won't be able to read it without first decrypting the m4 to m3 if this matches with what A has on the device then he can read the message. Once the message is read the verification process is complete. Lokchain ledger now logs the transaction details as header and metadata these makes up the history. An update will be propagated across the nodes by using a similar cryptographic method as well.

This copy could be downloaded (this was shown in scenario 2) from other nodes in the network. The best copy other than the initial block is the one proven and validated by tenure. It is mostly obtained during registration; followed by embedding MPIN m2 encrypt on device. The copies are updated regularly as more files build upon the chain.

User Interface (Manager)

Our user interface will include a payment tab or ribbon which when opened by the user will present an interface capable of below:

i. Messenger
   a. Sms encryption
   b. Email encryption
ii. sCloud for msp like icloud, skydrive, google drive, dropbox etc encryption
iii. AWS portal
iv. Azure portal
v. Universal wallet (this is for payment)
Wallet Interaction Model
How is a Wallet Address (String) Generated?
   Our method is very subtle: Names that are spelled and pronounces in the same manner are still different when you invoke the modular protocol we invented. This crypto is quite suited for mostly, cloud and pervasive computing. We propose to form a wallet string from two or more things you are or have that are constant:
1. First and last name
2. IMEI, MAC address, Serial Number and other identifying numbers
3. Fingerprint
   We think that any combination of these three can produce a fitting but peculiar string for wallet purposes.
4. Full name+IMEI+Biometrics (middle fingerprint) or Full name+MAC+Biometrics (middle fingerprint)—IoT
eFRI Process Flow FIG. 1.2 See related disclosure document cited in related applications
1. eFRI Process Flow see FIG. 1.2:
   1. A digital image of the user's finger print (live scan as it is called) is captured. A knight tour template KT of any position is randomly chosen from 256(pow,256) permutation a combination.
   2. The positive or dominant ridges of the finger prints are noted and mapped to numbers in KT. It is like covering an impression with a net: The holes in the net will expose part of the impression. Here in, the holes might not show a very clear part of the whole impression. However, the smaller the impression prints compare to the holes in the net the better representation of the impression you will get. The outstanding marks cannot be missed totally.
   3. Now map ST to KT to obtain a cipher template $M_1$. You can now use the numbers attached to the ridges as place holders: You can get a corresponding character by taking the numbers in KT and matching them up with the same indices in $M_1$. Another way is to map KT to the positive ridges found on the live scan. The numbers assigned can now be related to the corresponding characters in $M_1$. You will obtain the characters. These are the characters following FIG. 1.1b
   STRING=Ĺ Ħ 1 ℏIJ ę Í+45:F6:40:D9:8C=>
   4. After the transposition and substitution (matrix transformation): Group the character together, it will be a string equal in length to the appropriate ridges for positive ID. Unique Identification=STRING+MAC=> Ĺ Ħ 1 ℏIJ ę Í+MAC
   5. Transposition—Numbers on the $KT_{n=1}$ are used as placeholders for the positive ridges of the finger print, then matched to the indices of the characters on $M_1$ if the number and any index matches then we take the character accessed by the index. See FIG. 0.1.2 and FIG. 1.1b
   6. Repeat the step 3 just for the MAC characters using mode $M_1$. The MAC here by will be taking the index of all values in the character associated to the string. These indices are decimal or numbers. We assume the MAC address (45:F6:40:D9:8C) of the device you will be assigning eFRI. You can add as many devices as possible with this particular $M_1$ or generate a new ST<->KT=$M_1$. You will obtain a string which will be the same length as the MAC address if changed to hex.
   Unique Identification=Ĺ Ħ 1 ℏIJ ę Í+192,161,14,128, 192,243,31,33,64,12 ^136r 4 5: F 6: 4 0: D 9: 8 C
   Now go to SL-$M_1$ convert the numbers back to characters. See FIG. 0.1.2d eFRI=Ĺ Ħ 1 ℏIJ ęÍ+&ʹ Þ (&$ ä+*2Čr
   We follow (alternate of the rightmost byte to leftmost byte with r at the end of the very string) pattern to shift the rows of the string obtained. The little r intimates the engine that the key came from reverse $M_1$ or SL-$M_1$. Together, these strings create an offset. This make is impossible for someone to clone a MAC address.
   eFRI=ČĹ2Ħ *1+ℏ ä IJ$ę& Í r
   You now have a unique identifier tying you to all your transactions and devices online.
Basically, a composite of the string values in 4 are reduced to the original information (plain text) that was transformed to ciphertext.
   Encrypt(fingerprint_number+MAC_number`(PKT$_n$FPD-EC-String=M$_{nanychosen}$; PKT$_n$MACHex-Dec=M$_{nanychosenreserse}$; PKT$_n$MACSL-DEC-Str-M$_{nanychosen}$)-send-Wallet manager Decrypt=eFRI components=>Use to Build Biometrics(eFRI) arrange them in order-compare-all to the data profile variables. If these compared fields match, then the wallet is verified and validated.
If you add your full name (Ex. Mike Obrien) to this using say SL-$M_1$ as the cipher you will get the Wallet address or ID:
   197,213,229,182,198,214,230 ^$KT_{n=136}$
Wallet address=Ĺ Ħ 1 ℏIJ ę Í+192,161,14,128,192,243,31, 33,64,12^PKT$_{n=136r}$
   & ʹ Þ (& $ ä +* 2 Čr
   +16,114,176,37,35,51,226,114,37,132^PKT$_{n=136r}$
Fullname msg=M i k e O b r i e n
$M_2$ map for msg=G e ! ] O ^£e] v PKT$_{n=162}$ 16 114 176 37 35 51 226 114 37 132
SLpswmsg.length=1 o v e l e s s 1 o PKT$_{n=136r}$ +194 146 162 37 194 37 240 240 194 146 −256
   Đ. a K»ij E o¿ /206 4 82 74 229 88 210 98 231 22 PKT$_{n=136r}$
Do $M_2$ swap to make all same name Mike Obrien unique. This is done by carrying out the password process on it using a periodic and random password (k) of length D=fullname.length. As you can see the silent password(psw) is streamed across the 'Fullname'. In the end the universal wallet address for public use:
   Ĺ Ħ 1 ℏIJ ę Í& ʹ Þ (& $ ä+* 2Đ.a K»ij E o¿/
   Encrypt(fingerprint_number+MAC_number+Fullname_number^(PKT$_n$FPDEC-String=M$_{nanychosen}$; PKT$_n$MACHex-Dec=M$_{nanychosenreverse}$; PKT$_n$MACSL-DEC-Str-M$_{nanychosen}$; PKT$_{n=162}$FN-Str-Str=SL-M$_{n=2}$)-send-Wallet manager Decrypt=eFRI components=>Use to Build Biometrics(eFRI+Fullname=Wallet Address) arrange them in order-compare-all to the wallet address held in Attributes or profile verifiable(s). If these compared fields match, then the wallet is verified and validated.
   It is possible to engage a show prove of simple universal wallet address PO(SUA) by sending to the recipient all or part of the number(s) used in generating the wallet address to prompt the user to build the wallet address and compare all to the user's profile attributes. See the sample process here Wallet address=197,213,229,182,198,214,230^$KT_{n=136}$+192,161,14,128,192,243,31,33,64,12^$PKT_{n=136r}$+16,114, 176,37,35,51,226,114,37,132^$PKT_{n=136r}$ Ĺ Ħ 1 ℏIJ ę Ì &

' Þ (&$ä+*2 M i k e O b r i e n $M_2$ map for msg=G e ! ] O ^£e] v $PKT_{n=162}$
16 114 176 37 35 51 226 114 37 132

SLpswmsg.length=1 o v e l e s s 1 o $PKT_{n=136r}$
+194 146 162 37 194 37 240 240 194 146
−256

Cipher msg=Ð. a K»ij E ○¿ /
206 4 82 74 229 88 210 98 231 22 $PKT_{n=136r}$

In a community of all mobile users the architecture of the transaction could fit these steps for a volunteer organization that provides a kind of remuneration using cryptocurrency.

Step 1
User is provided a specific number for the service: s/he sends a text to 54220
Message is #malny Step 2
User receives a link to web url by sms Step 3
User click the link whenever there is full internet service to benefit from the offerings.

Step 4
If user agrees and subscribes, then s/he will be asked to provide all needed verifiable(s): the browser will encrypt use the protocol defined earlier and send these information to the DB (No-SQL-MongoDB and MySQL). There they will be used as engines of smart contract, transactions and property.

Invoice Encryption Mechanism

The form can be used as a payment ticket or payment invoice. To negotiate any payment, we assume that you have a session ID upon coming live in the network. When you negotiate a transaction then you get a transaction ID. These small bits of date will help us out in Registering transactions accurately in the ledger.

Financial Ledger or Chain or Folder

This is a downloadable and non-transferable document (balance sheet) comprising of all data gleaned from Lokchain architecture. It cannot be modified in principle and practice. However, the files contained in it can be modified by each initiator (a file from a non-initiator is called a paired file and others thereafter are copies). The party to the session of any transaction receiving money is called the serviced (recipient). The serviced cannot modify any file in any ledger. The service can view and edit a part of the document solely available for its consumption. The ledger holds all the vital information making up the header and the metadata of the transactions.

File 1

1. User Profile manager This refers to the verifiable attributes which links the user; a specific profile and wallet.
   i. Pin encrypt
   ii. Password encrypt
   iii. Username
   iv. Official Name/company name
   v. Email/Official email
   vi. Location Addr
   vii. DOB
   viii. FEIN
   ix. Cell or mobile number
   x. IMEI
   xi. eFRI
   for user A and user B
2. Instrument manager
   This refers to the kind of currency used.
   iv. LokCoin
3. Protocol manager
   This will refer to the protocol used to negotiate the transaction step by step.
   iv. Lokdon encryption/decryption for Payments
4. User Interface for vendors, clients and financial institutions
   This refers to the interface which makes the process easy, transparent and visible to users.
   ii. Nice skin
5. LokChain wallet Controller
   This refers to the integration of 1, 2, 3, 4, 5 and 6 blocks of the process for any user with a vetted profile. Version #
6. Communication/Transaction manager
   This is built on connection abstraction to support remote connection which brings the idea of session to life. The session is between a wallet and another node (message, response). This could be quite asynchronous. Thus, it creates a request (over http) and response (using TCP/IP) over ethernet network. This makes for accountability and manages all transactions (including unsuccessful transactions): In-bound and out-bound the wallet calls, with reference given to the individual's wallet object, else does not apply.
   Session ID, Transaction ID, Source destination IP and protocols.

LokChain makes LokChain will make millions of transactions possible in lightning speed because of its decentralized P2P orientation in both network and storage. By embracing the developmental skills, problem terrains and local technical know-how in the emerging market. It will be a great option for documented world.

You want to use LokChain Platform because it was designed to:
   a. Turn disorder into secure governance based on roles, permission derived from combination of physiological and behavioral pattern. —DDNA
   b. Turn IoT devices into secure autonomous blockchain entities of things of values.
   c. Turn rural economies and manufacturing into the most secure transactions for wealth creation.
   d. Turn blockchain ICO into media of building infrastructural projects in emerging markets.
   e. Turn the world' largest business incubator into an innovation complex for Industrie 4.0

Find below some of the features excluded in LokChain platform.

1. It excludes irrelevant features which may not apply in Blockchain for emerging markets:
   a. Mining cost of electric power
   b. Centralization perpetuates third party
   c. Trust management
2. To solve all issues a business may have:
   a. Security
   b. Privacy
   c. Transparency
   d. Scalability
3. To bring ubiquity on blockchain
   A. Remove Latency problems
   B. Remove Low throughput problems 5.1 Special Case of Biometrics Identity and access will be indispensable in the new era. Thus, there is a need to use identity to leverage access as soon as we figure out: 1. What we need access to? 2. Why we need the access? 3. How we can start the access? We have developed some amazing biometric methods to achieve this. Amongst many, there is Electronic Finger Print Positive Ridge Identification (eFRI).

First thing we did was building a profile for each nodes or users. We have over 14 attributes:
1. Full name/Company name
2. registered:company email/email
3. Location:addr/company addr
4. Finger print
5. Password
6. MPIN
7. Drivers lic # (DL)
8. Passport # (PP)
9. IMEI/MAC/UID
10. Cell Phone/mobile number in use
11. other biometrics
12. Date of birth (DOB)
13 Social Security (SS)
14. Username
15. FEIN These are encrypted to formulate data nucleus aggregator (DNA) a collection of unique biometric specific to a kind. The platform's profile and built with this protocol. A collection of each different profile is called Digital Data Nucleic Authority (DDNA). This is can be used by any node in lokchain network. The nodes share ledger which contains pertinent data PII, PHI, PCI-DSS and GDPR. It is pertinent that we understand how chosen biometrics can be combines to give the most desired result for authentication and protection of the user and the network.

5.2 Identity Access Manager and Permission

The identity access management here in, differs from what we have used in the past and the present time. It just doesn't show the best way to handle access in a decentralized approach. More so, it holds at the core the concept of:
1. What you are (WYA)-A
2. What you have (WYH)-H
3. 3. What you know (WYK)-K Number 1 doesn't change over time, but you can always loose number 2 and 3. Armed with this information, we can create a table or mathematical set which can emulate the file permission in Unix/Linux operating system. This can absolutely allow some leverage in access permission for all nodes in lokchain network. Other similar method could possibly be derived, but this is the first attempt to 'chmod' permission in distributed ledger permission. We have created a set and subset of the permissions allowed. However, we must define precisely the absolute nature of the parameters presented.

What you are will refer to all anatomical features on a user's being that can be used as an infallible mean of identification: These are referenced to the thumbs and other body parts as unique, printable, non-duplicable, portable and legally collectible as a reference to physiological facts directly connected to other user's anatomy. E.g Finger print, iris, and face.

What you have will refers to whatever was given to you that you obtained from an authorized person as an enabler to gaining access to any system that authenticates the user in, for further authorization of resource usage. E.g Soft and hard token What you know will refer to your brainchild in the form of a PIN and Password of a certain acceptable complexity; alpha; numeric and special-character ensemble which none other than possesses except you This will serve as a solid yardstick or measure for users, groups and other policies currently implemented in the ecosystem. The zero permission (no permission for UGO) could be used widely depending on the environment and which permission needs to be curtailed to boost security of data and infrastructure. We can follow the 'chmod' biometric wheels methodology to determine a user or nodes permission to resources. This will ultimately be very useful in constrained environment where autonomy is valued more than policies. This allows easy identification of rogue devices especially when the records kept on these devices are immutable.

Universal Wallet Address

This is the address which ties a user to all his/her devices using attributes. The attributes are the component of data nucleus aggregate (DNA) This is derived using eFRI (fingerprint, IMEI or MAC) and full name; company name or combination of attributes that serves the purpose. It could be arranged to follow the set outlined in the special case. We can easily and effectively sustain a universal wallet address (UWA): Total number of possible UWA addresses $2\textasciicircum 2048$ or 3.231700607131100730071487668867 $10\textasciicircum 616$—more than stars in the sky or sand by the sea shores. This is true when those values making up the UWA are chosen from 256 characters noting that it could be a unique char-value in each element or another. The hashes of the protracted strings could be used to shorten them. QR codes could be derived and used in cases where the model offers a high security otherwise it is not recommended. This will usher in a free sovereign ID system (SOVIDS).

Creation of Transaction Identification (Transactionid):

ZKP-Triangle protocol 1.RCD→Request, Credit, Debit
  2. ACK→Acknowledge
  3. CFM→Confirm
  4. RCV→Receive
  5. SND→Send
  6. RPY→Reply
  7. RCOD→Record.

We represent the flow mechanism and the indefatigable triangle in the diagram below (See FIG. 1F)

These verbiages are formulated to make sure any interference is aborted since the 'transactionid' or transaction identification will not issue. Once the transaction is confirmed by sender a 'transactionid' is issued using the time of the last 'sessionid' of the confirmed transaction. It is set in the like of military time 174013→5: 40:13 PM concatenate with that last 'sessionid' created from ordered arbitrary numbers. This serves as part of the headers and metadata ensemble. This counter measures will forestall rogues access points redirects.

The nascent nature of core Blockchain still makes it susceptible to MITM attacks. Therefore, it is inaccurate to say that it will securely send and receive restricted and non-restricted data while mitigating user's lack of privacy. LokChain was designed to forestall all inherent defects of the core blockchain. We believe that our approach will create wealth because the users have full control of their data. No entity in the world will have such control over the users anymore. Data owners will now be able to sell their data for asset gains-A new dawn for secure Data life cycle (SDLC) is here.

16. 6.0 Industrial IoT

Industrial IoT or Industrie 4.0 will be very instrumental for achieving the 4$^{th}$ industrial revolution. In the diagram below, we will show you the 4 stages architecture of the modern IIoT. We see clearly the direction needed to be taken in order to achieve the fits we deem to accomplish. Creating a serverless world doesn't have to start with just PKI.

We must pay attention to the processes of the EDGE devices. They usually will converge to a common server. See FIG. 7. Below you will envision what could be achieved by using LokChain to connect devices to service providers and enterprises. We present to you high level architecture to fill your curiosity. I am sure that you are already thinking of the myriads of possibilities here and below. What if these two stages 3 and 4 happen on the blockchain. This linkage of regions are the crux of IoT longevity and blockchain infancy. Edge devices where introduced for enterprise to increase performance and minimize latency. How well, will all these do as soon as 20 Billion+ devices show up by 2020? Lokchain introduction of DNA and DDNA as a part of the secret key infrastructure gives all devices and users the autonomy needed as an entity and as well as their use and storage of data.

See FIG. 8 for representation of an Ideal IoT ecosystem

Follow a Use Case of ZT-Flow protocol
1. Lokdon Wallet Application
2. General Data Protection Regulation (GDPR)
   Using LokChain to implement GDPR is the best way to rid yourself of the data to accomplish the right to forget.
3. Smart Manufacturing Areas where Lokdon Technology can help:

NIST Lightweight Cryptography draft [SIC 2017] calls for standard algorithm for lightweight cryptography. When you look at the drafted document: It is quite clear that IoT devices will be fitted on a second-class encryption capacity. It doesn't have to be that way because IoT will have more footprints and activities come 2020 [6]. Gartner and Cisco have predicted the availability of over 20+B IoT devices in the nearest future. They called this a new terrain of threats as in Internet of Threats (IoTh)

Manufacturing:

There are three smart components needed in the future manufacturing or Industrie 4.0.
1. Humans
   Human can always build and initiate the process.
2. Robotics/IoT Technology
   Humans and the machines will depend on technology to act.
3. Specialized Machines (smart phones) with sensors: MCU forming Cyber physicals devices.
   These are the software and hardware bye products of the technology We will illustrate a simple manufacturing process by creating a makeshift process. The point is to demonstrate a security gap in the IoT implementation which demands serious solutions. Say Shift supervisor in Germany or Japan wakes up at 5. At 5:30 am the production line at a beverage company starts up. He now places a call at 5: 25 am to activate the manufacturing line which includes 2 or 3 robots. The duties of the robots are defined below:
1. Reference the container material, size (volume), shape and color (compare stored data)
2. Must be aware of its content (liquid reserve) and the containers capacity (How? AI)
3. Ascertain that the right container is on the conveyor belt (How? Sensor security in Robert/containers)
4. Fill the beverage containers up to the acceptable volume (container sensors)
5. Once done cork, label and box it up in a case of 12s. (AI or robots)
6. Stack them up in pellets (240) for delivery. (AI or robots)
7. Each robot will Continue for 100 pellets, if the containers=>24000.

The duties of the containers carrying the beverages:
1. Make certain that the right robots serve it. (How? Sensor security)
2. Ascertain that he beverage is consistent in volume, color and density(texture)

We are equipped to solve this problem identified in #3 of the robot's duties and the #2 of the container's duties. These now becomes pervasive problem to all. If this identification is not effectively carried out, then rogue containers and robots could easily be used by swapping the real ones.

Collective Problems
  a. Ascertain that the right container is on the conveyor belt (How? Sensor security in Robot/containers)
  b. Make certain that the right robots serve containers (How? Sensor security)

In mechanism shown below we see that the critical points in security are: a and b above. The point where the robot and container converge should be examined seriously for imposition by any external forces.

Lokdon technology will address:
1. Stopping impostors or rogue devices from the network
2. Avoiding MITM and DDOS
3. Making sure of robots and containers identity are verified 8.2 Advantages Technical
1. It excludes irrelevant features which may not apply in Blockchain for emerging markets:
  a. Mining cost of electric power
  b. Centralization perpetuates third party
  c. Trust management
2. To solve all issues a business may have:
  a. Security
  b. Privacy
  c. Transparency
  d. Scalability
3. To bring ubiquity on blockchain
  A. Remove Latency problems
  B. Remove Low throughput problems
  C. Remove scalability problems Core
  a. Smart Contract Here in, digital assets are directly controlled by automation or lines of codes via initial agreement, to perform certain functions particularly when triggered. The trigger points could be set by arbitrary rules or even LokChain™-based "decentralized autonomous organizations" leveraging their association to affect these contract agreements.
  b. Decentralized Application (Dapp)

This refers to removal of the control held by a central organization or location over applications. The ideas allow all to publish their unstoppable application absent a third party. Users should have control over the data they share on the network. Master ledger is only a yardstick cloned by all nodes. Any node can update its ledger from another node's ledger content, provided the ledger is the most current.
  c. Smart Transaction Here in, every party in the ecosystem has agreed on a sales bound by 1. smart contract, 2. smart property. When the values agreed are transferred fully to smart satisfaction. We can say that a smart transaction has just been fully negotiated. The nodes involved completes the transaction from start to finish there is no need for mining here.

d. Quantum Immunity

The use of a high-level encryption (2048 Bits) mechanism that is immune to attack by quantum computing.

e. Smart Property

Here in, your physical (phone, house, Gold, diamond, car etc.) and soft-assets (cloud-based machines, virtual money and shares in companies) can effectively be reduced to pieces of unique strings embedded with your biometrics; This will remove fraud and create an environment where trade is free absent fear or distrust. A smart property will bring about a smart contract and a smart transaction. None will be wary to buy a smart property from you. Trades that never would have taken place online will now be accepted conscientiously. People will have confidence in lieu of less trust when engaging in smart property sales.

f. IoT in the Chain

We are determined to solve the future problems arising from billions of internet nodes and devices remaining constantly online. Blockchain technology made this possible. We want to achieve the most unprecedented digital barter the world had ever experienced through a seamless end-point-to-end-point cryptographic security. We thought it wise to secure what we have seen over the years, before any serious development. We used secret key infrastructure (SKI) and many vital features of ours as a thread, binding the best of the three worlds:

8.3 Products and Services

LokChain for the enterprise is an extreme performance initiative of the blockchain technology. It is designed from bottom up to provide independent, reliable development which absorbs the local insight from the emerging market. This is an option to the documented world because it will enable the emerging market to discover and access the necessities of life across the globe. The health, Legal, Pharmaceutical, Agriculture, Government, e-Commerce and Manufacturing are some of the business verticals that could possibly use this platform. LokCoin (LCN) is the default coin/token for this platform.

Product:
1. Lokchain Platform
2. Lokchain Wallet Dapp
3. Lokchain DLT solutions
4. Lokchain Exchange Security
5. Lokchain Consulting Projects
6. Infrastructure Development
7. SKI-SDK for integrating enterprise, IoT and mobile software
8. Lokchain IoT Dashboard/Wallet Services:
1. Smart License Plate signage and Tabs Payment
2. Wallet Application for Mobile/IoT
3. Dashboard for Tracking and IoT funding
4. OTC Merchant Integration
5, Digital Data Nucleic Authority architect
6. UN Refugee programs (No ID initiative)
7. AgroTech ecosystem (corn or maize)
8. Asset Management (smart property)
9. Dapp (SDK/Framework support)
10. NanoTech ecosystem (Identity provision)
11. Wild-life tracking and protection
12. LCN Fleet Check/Card
13. Directing trading in commodity to support #7
14. LokChaining-Interconnection of blockchain, IoT and mobile consulting
15. Trucking Logistics Factoring The following claims will detail the operation of each module, and inter-operation between modules.

I. Embodiments of the Present Disclosure Provide a Software and Hardware Platform Comprised of a Distributed Set of Modules, Including, but not Limited to A. IIES Application Modules 125; and
B. Universal Wallet Address Module 145.

In some embodiments, the present disclosure may provide an additional set of modules for further facilitating the software and hardware platform. The additional set of modules may comprise, but not be limited to:

II. Embodiments of the Present Disclosure Provide a Software and Hardware Platform Comprised of a Distributed Set of Computing Elements, Including, but not Limited to A. A Computing Device The computing device comprising, but not limited to at least one of the following:
   A processing unit,
   A memory storage,
Wherein the computing device may be embodied as a mobile computing device,
   wherein the mobile computing device comprises, but is not limited to,
     A tablet,
     A smartphone,
     A drone,
     A wearable camera,
     A handheld camera,
     An installed camera, and
     A remotely operable recording device;
   1. The User Interface Module
     a. Enables user-control of the Computing Device
     b. Enables user-control of the Sub-Modules of the Computing Device Various hardware components may be used at the various stages of operations follow the method and computer-readable medium. For example, although the methods have been described to be performed by a computing device, it should be understood that, in some embodiments, different operations may be performed by different networked elements in operative communication with the computing device. For example, server 110 and/or computing device 600 may be employed in the performance of some or all of the stages disclosed with regard to the methods below.

III. Embodiments of the Present Disclosure Provide a Hardware and Software Platform Operative by a Set of Methods and Computer-Readable Media Comprising Instructions Configured to Operate the Aforementioned Modules and Computing Elements in Accordance with the Methods The methods and computer-readable media may comprise a set of instructions which when executed are configured to enable a method for inter-operating at least one of the following modules:
A. IoT Module;
B. Registration Module;

C. Encryption/Decryption Module; and

D. Universal Wallet Address (UAW) Module

The aforementioned modules may be inter-operated to perform a method comprising the following stages:

17. An industrial internet encryption system comprising:
a server;
an industrial internet encryption system application module;
a user interface module;
a lokchain module;
an endpoint to endpoint cryptographic module for generating secret keys; and
an industrial internet encryption system server.

18. The industrial internet encryption system of stage1, further comprising at least one of: an encryption module, a decryption module, an identity access management module, a universal wallet address module, a data nucleus aggregated information (DNA) module, a digital data nucleic authority (DDNA) module, a profile management module, and a registration module.

19. The industrial internet encryption system of stage 1, further comprising at least one of: a server encryption module, a server decryption module, a device registration module, a device transmission module, an Internet of Things (IoT) device admin module, a database, an Internet of Things (IoT) services module.

20. The industrial internet encryption system of stage 1, further comprising:
a device registration module wherein the device registration module comprises at least one of: an Internet of Things (IoT) device tracking layer module, an Internet of Things (IoT) device application layer module, and an Internet of Things (IoT) device attributes layer module;
a device transmission module wherein the device transmission module comprises at least one module for: satellite communication, GPS communication, wireless communication, infrared communication, Wi-Fi communication, and Bluetooth communication; and
a device registration module wherein the device registration module comprises at least one of: an Internet of Things (IoT) permissions layer module, an Internet of Things (IoT) analytics layer module, an Internet of Things (IoT) roles layer module, and an Internet of Things (IoT) policy layer module.

21. The industrial internet encryption system of stage 1, further comprising:
an Internet of Things (IoT) Services module wherein the Internet of Things (IoT) services module comprises at least one of: an Internet of Things (IoT) device commands module, an Internet of Things (IoT) device communication module, an Internet of Things (IoT) analytics module, and an Internet of Things (IoT) automations module; and
a registration module wherein the registration module comprises at least one of: a data nucleus aggregated information (DNA) registration module, a digital data nucleic authority (DDNA) information registration module, a universal wallet address (UWA) management module, and a profile distribution module.

Although the stages are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

IV. Embodiments of the Present Disclosure Provide a Hardware and Software Platform Operative as a Distributed System of Modules and Computing Elements III. Platform Operation FIGS. 2, 3A, 3B, 3C, 4A, and 7 are flow charts setting forth the general stages involved in a methods 200, 300A-C, 400A, and 700 consistent with an embodiment of the disclosure for providing Industrial Internet Encryption System (IIES) platform 100. Methods 200, 300A-C, 400A, and 700 may be implemented using a computing device 600 as described in more detail below with respect to FIG. 6.

Although methods 200, 300A-C, 400A, and 700 have been described to be performed by platform 100, it should be understood that computing device 600 may be used to perform the various stages of method 200, 300A-C, 400A, and 700. Furthermore, in some embodiments, different operations may be performed by different networked elements in operative communication with computing device 600. For example, server 110 may be employed in the performance of some or all of the stages in method 600. Moreover, server 110 may be configured much like computing device 600. Similarly, apparatuses 115, 125, 130, 120C, 125C, and 130C may be employed in the performance of some or all of the stages in method 600. Apparatus 115, 125, 130, 120C, 125C, and 130C may also be configured much like computing device 600.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of methods 200, 300, 400, and 700 will be described in greater detail below.

Figure 2:
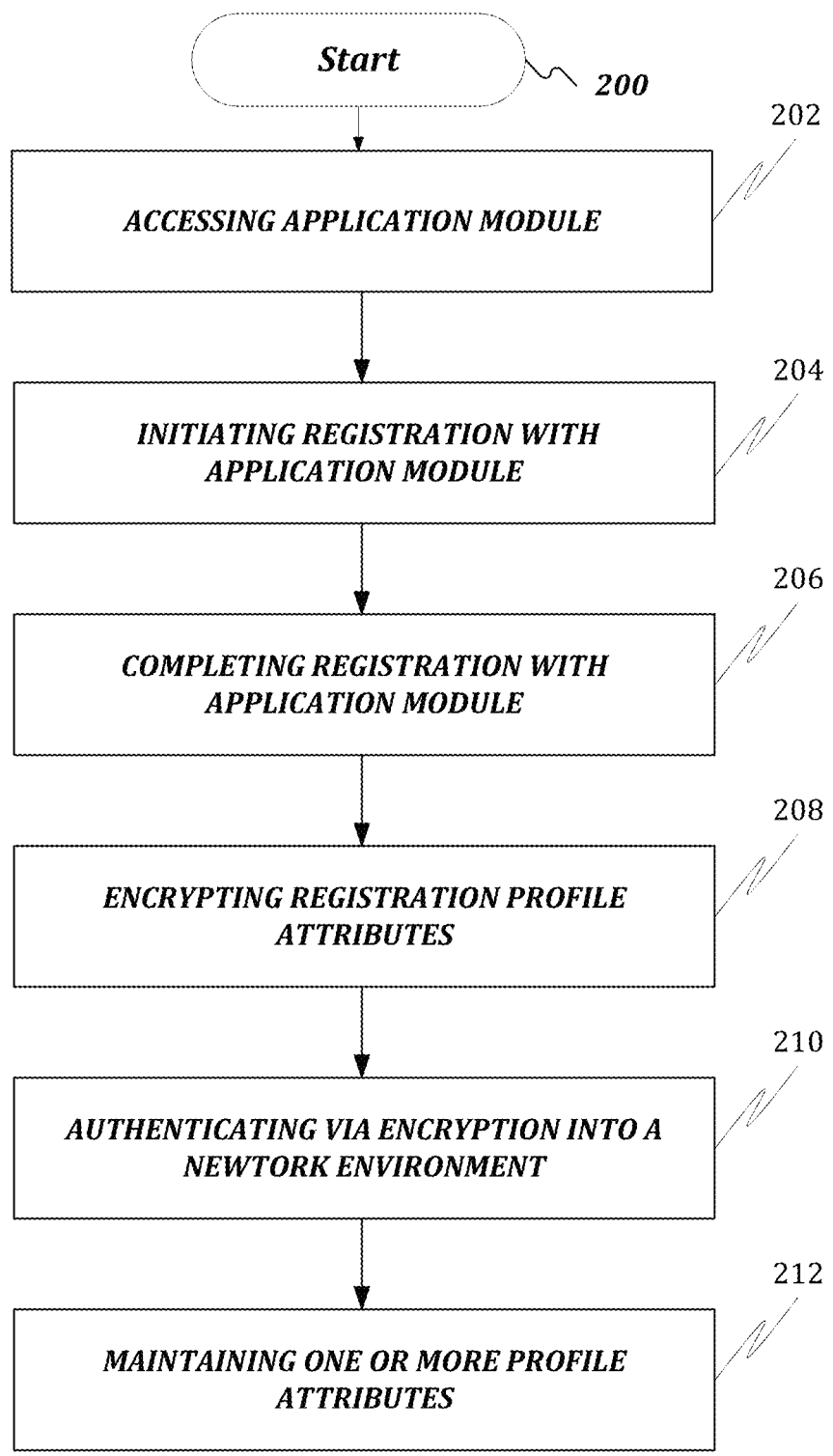
FIG. 2 is a flow chart of a method for providing an Industrial Internet Encryption System (IIES)

FIG. 2 is a flow chart of a method for providing an Industrial Internet Encryption System (IIES). Method 200 may begin at starting block and proceed to stage 202 where computing device 600 may access the application module. For example, an Industrial Internet Encryption System (IIES) application module including but not limited to a registration module, LokChain module, Profile management module, Universal Wallet Address (UWA) Module, Identity Access Management Module, Encryption Module, Decryption Module, artificial intelligence (AI) Module, End To End Module, internet of things (IoT) Services Module.

From stage 202, where computing device 600 accesses the application module, method 200 may advance to stage 204 where computing device 600 may initiate registration with the application module. For example, a user or a device may register via the universal wallet address (UWA) system.

Once computing device 600 initiates registration with the application module in stage 204, method 200 may continue to stage 206 where computing device 600 may complete registration with the application module. For example, a user or device may enter personally identifiable information (PII) into a user interface module.

Once computing device 600 completes the registration with the application module in stage 206, method 200 may continue to stage 208 where computing device 600 may encrypt registration profile attributes. For example, a universal wallet address (UWA) module may encrypt all personally identifiable information.

After computing device 600 encrypts registration profile attributes in stage 208, method 200 may proceed to stage 210 where computing device 600 may authenticate into a network environment via an encryption. For example, authenticating into a personal area network (PAN), local area network (LAN), wide area network (WAN), or storage area network (SAN). Once computing device 600 authenticate into a network environment via an encryption in stage 210, method 200 may then maintain one or more profile attributes, for example in a profile management module at stage 212.

Figure 3A:
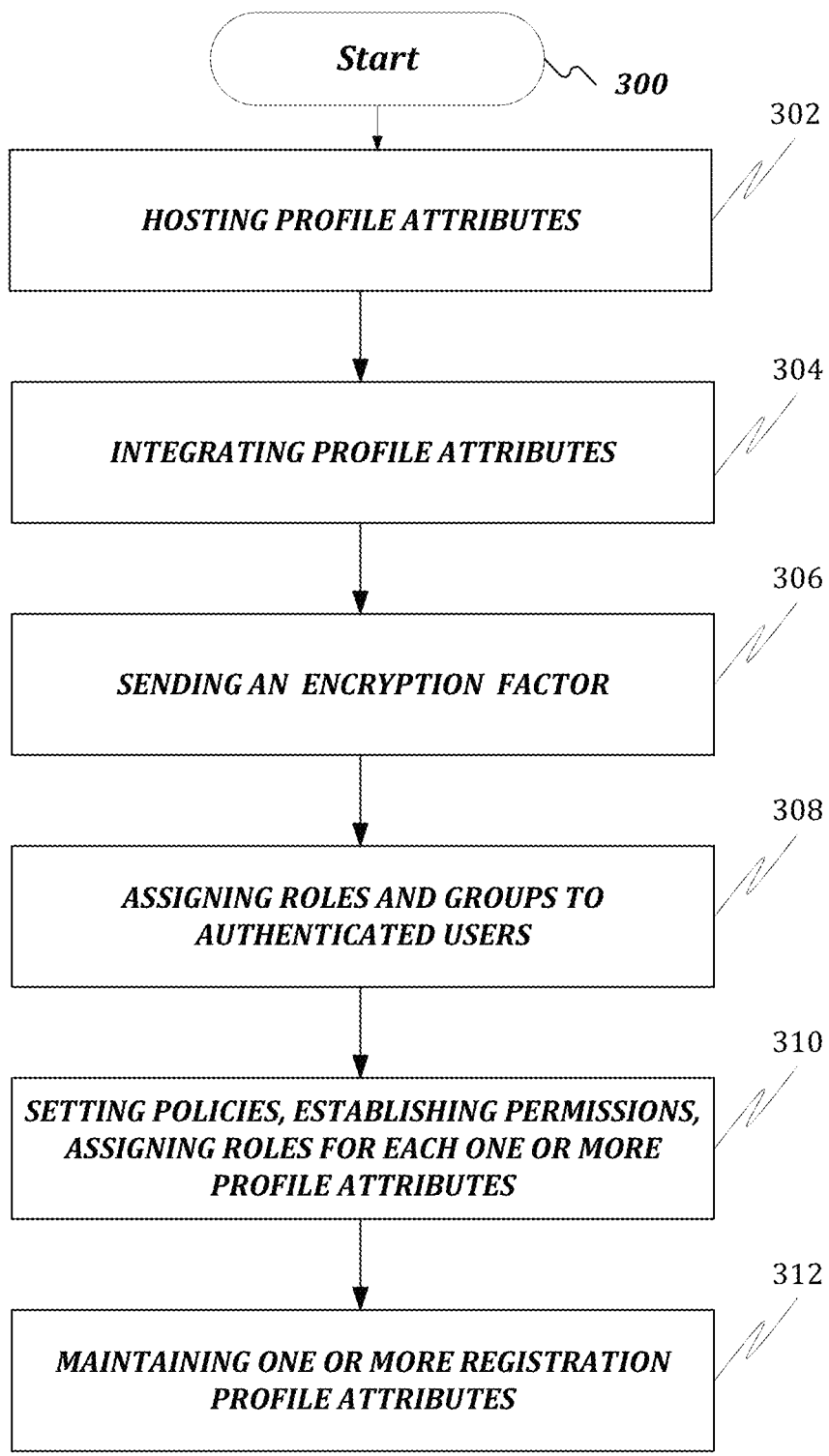
FIG. 3A is a flow chart of a method for providing an Industrial Internet Encryption System (IIES)

FIG. 3A is a flow chart of a method for providing an Industrial Internet Encryption System (IIES). Method 300 may begin at starting block and proceed to stage 302 where computing device 600 may host profile attributes. For example, a profile management module may host the profile attributes.

From stage 302, where computing device 600 may host profile attributes, method 300 may advance to stage 304 where computing device 600 may integrate profile attributes. For example, a profile management module may integrate the profile attributes.

Once computing device 600 integrates profile attributes in stage 304, method 300 may continue to stage 306 where computing device 600 may send an encryption factor. For example, an encryption factor may be a mode according to the LokChain module of M1, M2, M3, M4, or M5.

Once computing device 600 sends an encryption factor in stage 306, method 300 may continue to stage 308 where computing device 600 may assigns roles and groups to authenticated users. For example, assigning roles and groups to users and devices having authentication.

After computing device 600 assigns roles and groups to authenticated users in stage 308, method 300 may proceed to stage 310 where computing device 600 may set policies, establish permissions, assign roles for each one or more profile attributes. For example, establish permissions, assign roles for each one or more profile attributes of each authenticated user and device. Once computing device 600 establish permissions, assign roles for each one or more profile attributes in stage 310, method 300 may then end at stage 312 maintaining one or more registration profile attributes.

Figure 3B:
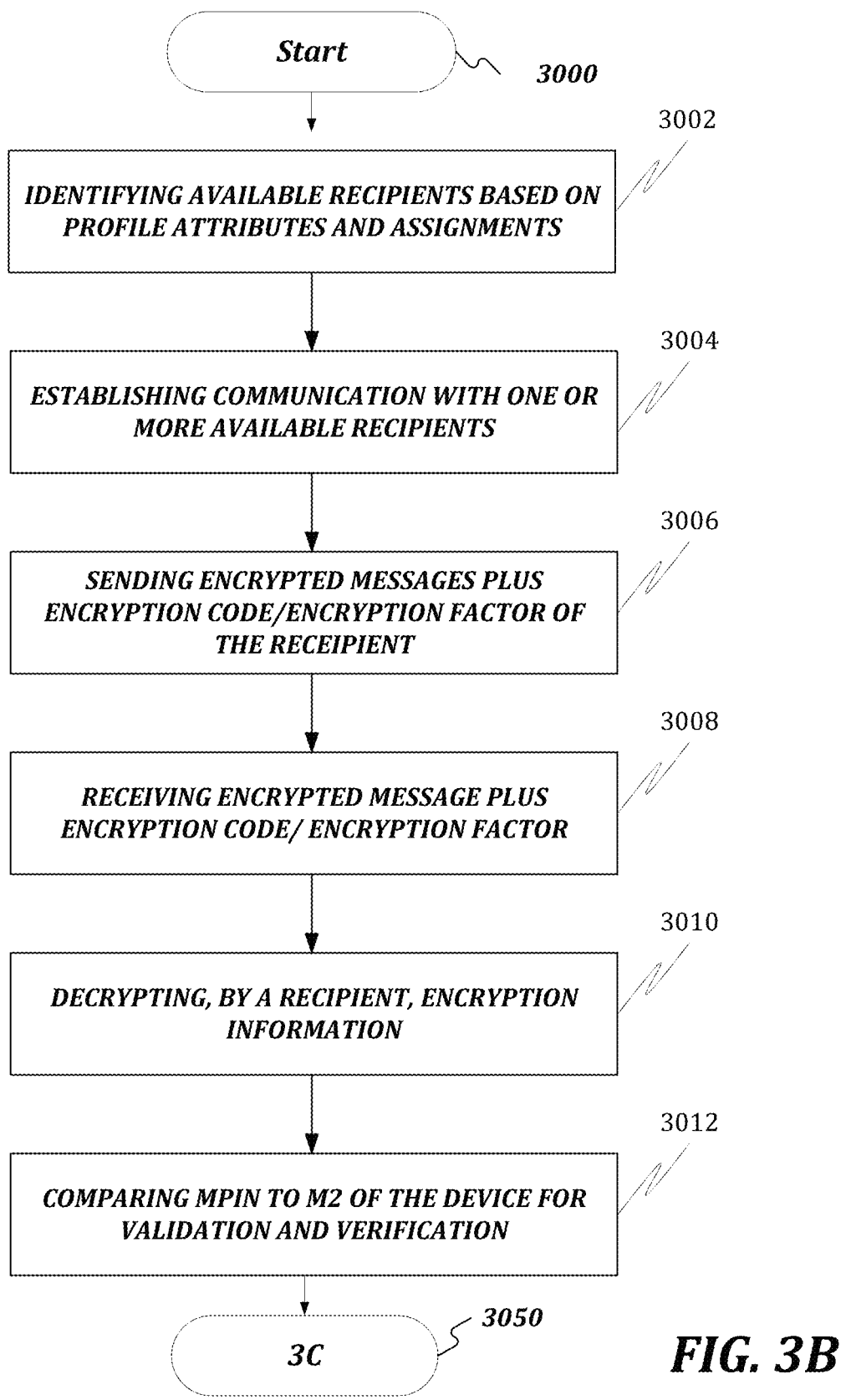
FIG. 3B is a flow chart of a method for providing an Industrial Internet Encryption System (IIES)

FIG. 3B is a flow chart of a method for providing an Industrial Internet Encryption System (IIES). Method 3000 may begin at starting block and proceed to stage 3002 where computing device 600 may identify available recipients based on profile attributes and assignments. For example, identifying available recipients based on profile attributes and assignments for each authenticated user and device.

From stage 3002, where computing device 600 identify available recipients based on profile attributes and assignments, method 3000 may advance to stage 3004 where computing device 600 may establish communication with one or more available recipients based on profile attributes and assignments. For example, establish communication with one or more available recipients based on profile attributes and assignments wherein the one or more recipients is an authenticated user or an authenticated device.

Once computing device 600 establishes communication with one or more available recipients based on profile attributes and assignments in stage 3004, method 3000 may continue to stage 3006 where computing device 600 may send encrypted messages plus an encryption code/encryption factor. For example, send encrypted messages plus an encryption code/encryption factor wherein the encryption code may be an MPIN and the encryption factor may be M1, M2, M3, M4 or M5.

Once computing device 600 sends encrypted messages plus an encryption code/encryption factor in stage 3006, method 3000 may continue to stage 3008 where computing device 600 may receive and encrypted message plus an encryption code/encryption factor. For example, receiving encrypted messages plus an encryption code/encryption factor wherein the encryption code may be an MPIN and the encryption factor may be M1, M2, M3, M4 or M5.

After computing device 600 may receive and encrypted message plus an encryption code/encryption factor in stage 3008, method 3000 may proceed to stage 3010 where computing device 600 may decrypt encryption information. For example, decrypting by an authenticated user or authenticated device. Once computing device 600 decrypts encryption information in stage 3010, method 3000 may then end at stage 3012, comparing the encryption factor and encryption code of an authenticated device for validation and verification.

Figure 3C:
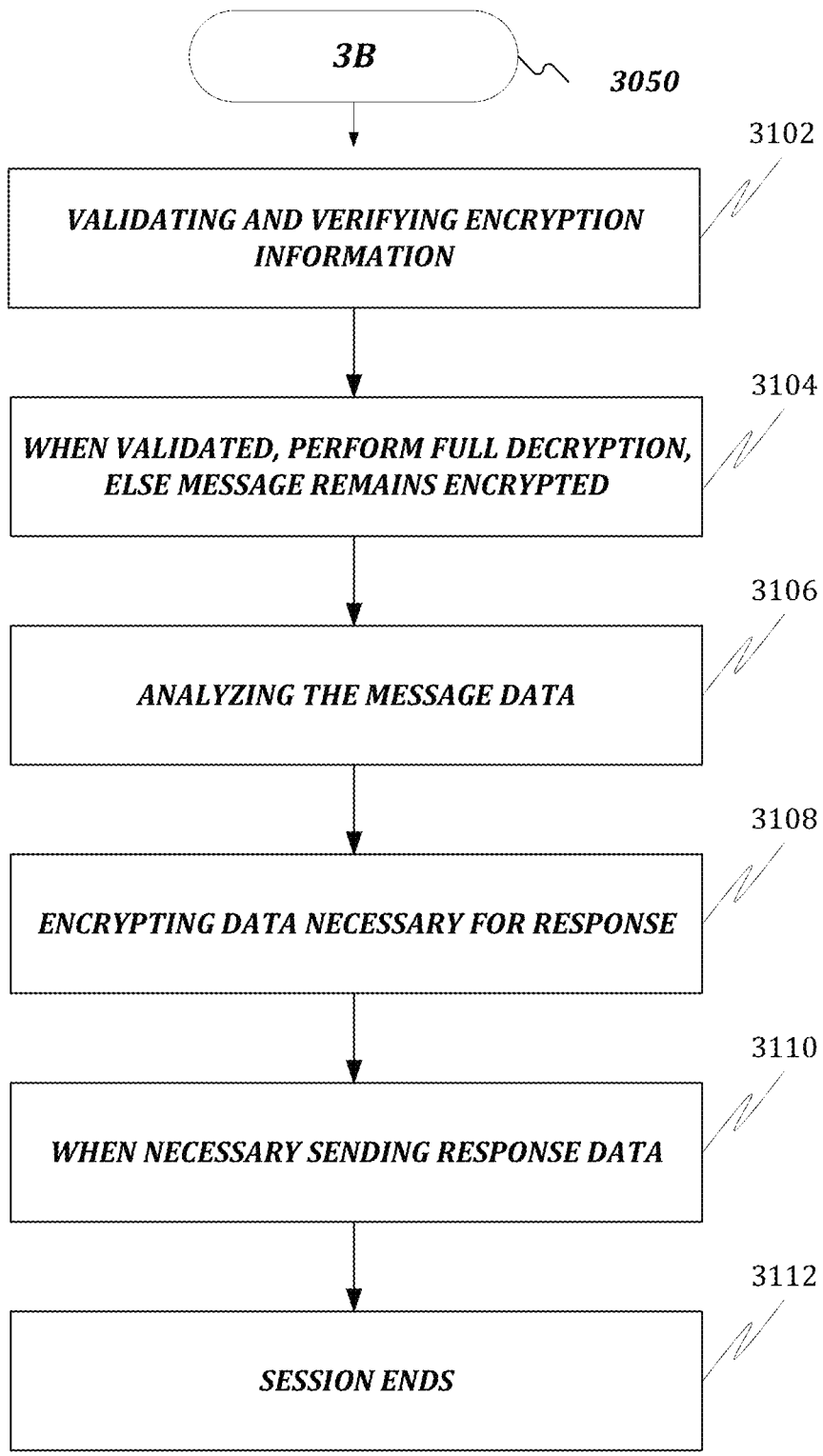
FIG. 3C is a flow chart of a method for providing an Industrial Internet Encryption System (IIES)

FIG. 3C is a flow chart of a method for providing an Industrial Internet Encryption System (IIES). Method 3050 may begin at starting block and proceed to stage 3102 where computing device 600 may validate and verify encryption information. For example, validating and verifying encryption information for each authenticated user and device.

From stage 3102, where computing device 600 may validate and verify encryption information, method 3050 may advance to stage 3104 where computing device 600 may perform full decryption of messages when validated. Once computing device 600 may perform full decryption of messages when validated in stage 3104, method 3050 may continue to stage 3106 where computing device 600 may analyze message data. Method 3050 may continue to stage 3108 where computing device 600 may encrypt data for a response message. Method 3050 may proceed to stage 3110 where computing device 600 may send a response when required. Method 3050 may then end at stage 3112.

FIG. 4A is a flow chart of a method for providing a Universal Wallet Address (UWA) system 400 within the Industrial Internet Encryption System (IIES). Universal Wallet Address (UWA) system 400 starts with a user 105 registering 405, collecting profile attributes 410, performing local encryption using LokChain technology 415, maintaining profile information at a profile manager 420, formatting encryption blocks using an Electronic Finger Print Positive Ridge Identification (eFRI) and Universal Wallet Address (UWA) 425, testing the successful performance of the encryption with a proof of work, dynamically updating the profile of each user and device profile 430, utilizing Universal Wallet Address (UWA) strings or alphanumeric characters, encryption codes including MPINs and passwords 435, and utilizing Universal Wallet Address (UWA) strings as tokens for secured communication to any authenticated recipient 440. The Universal Wallet Address (UWA) is a pivotal component of the Industrial Internet Encryption System and the secret key infrastructure.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of methods 200, 300, 400, and 700 will be described in greater detail below.

22. A method for providing an industrial internet encryption system comprising:
  accessing an application module;
  initiating registration with the application module;
  completing registration with the application module by providing profile attributes;
  locally encrypting registration profile attributes;
  authenticating into a networked environment using encrypted registration information; and
  maintaining registration information for one or more devices.

23. The method of claim 1, further comprising wherein the profile attributes are at least one of: a fingerprint, a name, a media access control (MAC) address, an international mobile equipment identity (IMEI) number, a password, a cellular phone number, an address, a date of birth, a driver's license, an email address, a username, data nucleus aggregated information (DNA), digital data nucleic authority (DDNA) information, and other personally identifiable information.

24. The method of stage 2, further comprising wherein the encrypted registration profile attributes is at least one of data nucleus aggregated information (DNA) and digital data nucleic authority (DDNA) information.

25. The method of stage 1, further comprising wherein the networked environment is at least one of a personal area network (PAN), a local area network (LAN), and other network.

26. The method of stage 1, wherein locally encrypting registration profile attributes further comprises five encryption factors including M1, M2, M3, M4, and M5.

27. The method of stage 1, further comprising:
  hosting, by a profile manager, profile attributes;
  sending, by the profile manager, an encryption factor to all requestors;
  identifying authenticated users based on an encryption factor; and
  assigning roles and groups to one or more authenticated users.

28. The method of stage 6, further comprising wherein the one or more authenticated users includes one or more of: mobile devices, industrial devices, artificial intelligence devices, personal computers, and in Internet of Things (IoT) devices.

29. The method of stage 6, further comprising:
  setting one or more policies for one or more devices;
  establishing permissions for one or more devices;
  assigning roles for one or more devices; and
  maintaining profile information for one or more devices.

30. The method of stage 6, further comprising:
  identifying available recipient devices based on profile attributes;
  establishing communication with one or more available recipient devices; and
  sending encrypted messages to one or more available recipient devices.

31. The method of stage 9, further comprising:
  receiving, by one or more recipient devices, one or more encrypted messages;
  decrypting, by one or more recipient devices, encryption information;
  comparing, by one or more recipient devices, encryption information for validation and verification; and
  validating and verifying encryption information.

32. The method of stage 10, further comprising:
  fully decrypting, by one or more recipient devices, received encrypted message when validation and verification is successful;
  analyzing, by one or more recipient devices, message data;
  determining, by one or more recipient devices, whether response is required;
  encrypting data necessary for response; and
  sending, by one or more recipient devices, response.

33. A method, comprising:
  registering, by a user, a profile;
  collecting profile attributes wherein profile attributes comprise: fingerprint, international mobile equipment identity (IMEI), an encryption code, media access control (MAC) address, name, driver's license, date of birth, biometric data;
  locally encrypting collected profile attribute information;
  sending locally encrypted data to a profile manager;
  forming a universal wallet address system using encrypted collected profile attribute information;
  validating and confirming encrypted collected profile attribute information based on one or more encryption factors including M1, M2, M3, M4, and M5; and
  dynamically updating a profile manager all device information based on completion of the validation and confirmation.

34. The method of stage 9, further comprising:
  establishing a secret key infrastructure between one or more endpoint devices.

35. The method of stage 9, further comprising:
  establishing a unique identifier fingerprint from an encryption code and password;
  creating alpha numeric strings for device identification;
  tying, the alpha numeric strings to the unique identifier fingerprint; and
  utilizing the alpha numeric string as a token for secured communication between identified devices.

36. The method of stage 14, wherein creating alpha numeric strings for device identification further comprises creating a maximum of 32 strings for each one or more devices.

IV. Computing Device Architecture

The Industrial Internet Encryption System (IIES) platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the IIES platform 100 may be hosted on a centralized server, such as, for example, a cloud computing service. Although method 600 has been described to be performed by a computing device 600, it should be understood that, in some embodiments, different operations may be performed by different networked elements in operative communication with computing device 600.

Embodiments of the present disclosure may comprise a system having a memory storage and a processing unit. The processing unit coupled to the memory storage, wherein the processing unit is configured to perform the stages of method 600.

FIG. 6 is a block diagram of a system including computing device 600. Consistent with an embodiment of the disclosure, the aforementioned memory storage and processing unit may be implemented in a computing device, such as computing device 600 of FIG. 6. Any suitable combination of hardware, software, or firmware may be used to implement the memory storage and processing unit. For example, the memory storage and processing unit may be implemented with computing device 600 or any of other computing devices 618, in combination with computing device 600. The aforementioned system, device, and processors are examples and other systems, devices, and processors may comprise the aforementioned memory storage and processing unit, consistent with embodiments of the disclosure.

With reference to FIG. 6, a system consistent with an embodiment of the disclosure may include a computing device, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include operating system 605, one or more programming modules 606, and may include a program data 607. Operating system 605, for example, may be suitable for controlling computing device 600's operation. In one embodiment, programming modules 606 may include IIES application modules 620 including but not limited to a registration module, LokChain module, Profile management module, Universal Wallet Address Module, Identity Access Management Module, Encryption Module, Decryption Module, AI Module, End To End Module, INTERNET OF THINGS (JOT) Services Module. Furthermore, embodiments of the disclosure may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602, programming modules 606 (e.g., IIES application modules 620) may perform processes including, for example, one or more of method 600's stages as described above. The aforementioned process is an example, and processing unit 602 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and quantum computing elements. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

I. Aspects

The following disclose various Aspects of the present disclosure. The various Aspects are not to be construed as patent claims unless the language of the Aspect appears as a patent claim. The Aspects describe various non-limiting embodiments of the present disclosure.

Aspect 1. An IIES device comprising:
a sensor, a chip, a socket on a chip, a communication module, a machine learning module, an artificial intelligence module, a processing unit, a storage device; and Aspect 2. The IIES device of aspect 1, wherein the device is addressable by an alphanumeric string from the universal wallet address system.

Aspect 3. The IIES device of aspect 1, wherein the device autonomously determines actions based on a set of conditions, policies, roles, and assignments.

Aspect 4. The IIES device of aspect 1, wherein the device is configured to be controlled remotely.

Aspect 5. The IIES device of aspect 1, wherein the device is configured to perform actions without an administrator.

Aspect 6. The IIES device of aspect 1, wherein the device is adapted for use in an industrial environment.

Aspect 7. The IIES device of aspect 1, wherein the device is adapted for use in a SCADA system.

Aspect 8. The IIES device of aspect 1, wherein the device is configured to communicate via a decentralized encryption system.

Aspect 9. The IIES device of aspect 1, wherein the device is configured to communicate inside of a blockchain environment.

Aspect 10. The IIES device of aspect 1, wherein the device is configured to exclusively communicate in and Internet of Things (IoT) environment.

Aspect 11. The IIES device of aspect 1 further comprising a secret key infrastructure (SKI) that may be enabled to provide an Industrial Internet Encrpytion System V. Claims While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A method for providing an industrial internet encryption system comprising:
   accessing an application module;
   initiating registration with the application module;
   completing registration with the application module by providing profile attributes;
   locally encrypting registration profile attributes, wherein locally encrypting registration profile attributes further comprises at least five encryption factors including M1, M2, M3, M4, and M5,
      wherein M1 is polymorphic encrypted ciphertext converted from the registration profile attributes input, the polymorphic encrypting generated by:

mapping indices from the registration profile attributes to a knight's tour encryption cipher template generated by mapping standard characters to a knight's tour template matrix,
   adding the mapped indices to a randomly generated silent password,
   performing modular arithmetic resulting in the M1 converted polymorphic encrypted ciphertext,
   wherein M2 is polymorphic encrypted ciphertext converted from M1, using the method of generating M1 polymorphic encrypted ciphertext,
   wherein M3 is polymorphic encrypted ciphertext converted from M2, using the method of generating M1 polymorphic encrypted ciphertext,
      wherein M4 is polymorphic encrypted ciphertext converted from M3, using the method of generating M1 polymorphic encrypted ciphertext,
      wherein M5 is polymorphic encrypted ciphertext converted from M4, using the method of generating M1 polymorphic encrypted ciphertext;
   authenticating into a networked environment using encrypted registration information; and
   maintaining registration information for one or more devices.

2. The method of claim 1, further comprising wherein the profile attributes are at least one of: a fingerprint, a name, a media access control (MAC) address, an international mobile equipment identity (IMEI) number, a password, a cellular phone number, an address, a date of birth, a driver's license, an email address, a username, data nucleus aggregated information (DNA), digital data nucleic authority (DDNA) information, and other personally identifiable information.

3. The method of claim 2, further comprising wherein the encrypted registration profile attributes is at least one of data nucleus aggregated information (DNA) and digital data nucleic authority (DDNA) information.

4. The method of claim 1, further comprising wherein the networked environment is at least one of a personal area network (PAN), a local area network (LAN), and other network.

5. The method of claim 1, further comprising:
   hosting, by a profile manager, profile attributes;
   sending, by the profile manage9r, an encryption factor to requestors;
   identifying authenticated users based on an encryption factor; and
   assigning roles and groups to one or more authenticated users.

6. The method of claim 5, further comprising wherein the one or more authenticated users includes one or more of: mobile devices, industrial devices, artificial intelligence devices, personal computers, and Internet of Things (IoT) devices.

7. The method of claim 5, further comprising:
   setting one or more policies for one or more devices;
   establishing permissions for one or more devices;
   assigning roles for one or more devices; and
   maintaining profile information for one or more devices.

8. The method of claim 5, further comprising:
   identifying available recipient devices based on profile attributes;
   establishing communication with one or more available recipient devices; and
   sending encrypted messages to one or more available recipient devices.

9. The method of claim 8, further comprising:
   receiving, by one or more recipient devices, one or more encrypted messages;
   decrypting, by one or more recipient devices, encryption information;
   comparing, by one or more recipient devices, encryption information for validation and verification; and
   validating and verifying encryption information.

10. The method of claim 9, further comprising:
   fully decrypting, by one or more recipient devices, received encrypted message when validation and verification is successful;
   analyzing, by one or more recipient devices, message data;
   determining, by one or more recipient devices, whether a response is required;
   encrypting data for the response; and
   sending, by one or more recipient devices, response.

11. A method, comprising:
   registering, by a user, a profile;
   collecting profile attributes wherein profile attributes comprise: fingerprint, international mobile equipment identity (IMEI), an encryption code, media access control (MAC) address, name, driver's license, date of birth, biometric data;
   locally encrypting collected profile attribute information, wherein locally encrypting collected profile attribute information further comprises five encryption factors including M1, M2, M3, M4, and M5,
      wherein M1 is polymorphic encrypted ciphertext converted from the collected profile attribute information input, the polymorphic encrypting generated by:
         mapping indices from the collected profile attribute information to a knight's tour encryption cipher template generated by mapping characters to a knight's tour template matrix,
         adding the mapped indices to a randomly generated silent password,
         performing modular arithmetic resulting in the M1 converted polymorphic encrypted ciphertext,
      wherein M2 is polymorphic encrypted ciphertext converted from M1, the polymorphic encrypting generated by:
         mapping indices from M1 converted polymorphic encrypted ciphertext to a knight's tour encryption cipher template generated by mapping standard characters to a knight's tour template matrix,
         adding the mapped indices to a randomly generated silent password,
      performing modular arithmetic resulting in the M2 converted polymorphic encrypted ciphertext,
      wherein M3 is polymorphic encrypted ciphertext converted from M2, using the method of generating $M_1$ polymorphic encrypted ciphertext,
      wherein M4 is polymorphic encrypted ciphertext converted from M3, using the method of generating $M_1$ polymorphic encrypted ciphertext,
      wherein M5 is polymorphic encrypted ciphertext converted from M4, using the method of generating $M_1$ polymorphic encrypted ciphertext;
   sending locally encrypted data to a profile manager;
   forming a universal wallet address system using encrypted collected profile attribute information;
   validating and confirming encrypted collected profile attribute information based on the one or more encryption factors including $M_1$, M2, M3, M4, and M5; and dynamically updating a profile manager device information based on completion of the validation and confirmation.

12. The method of claim 11, further comprising:
establishing a secret key infrastructure between one or more endpoint devices.

13. The method of claim 11, further comprising:
establishing a unique identifier fingerprint from an encryption code and password;
creating alpha numeric strings for device identification;
tying, the alpha numeric strings to the unique identifier fingerprint; and
utilizing the alpha numeric string as a token for secured communication between identified devices.

14. The method of claim 13, wherein creating alpha numeric strings for device identification further comprises creating a maximum of 32 strings for one or more devices.

15. A system having a hardware processor, the system comprising:
a server with memory;
an industrial internet encryption system application module;
a user interface module;
a lokchain module;
an endpoint-to-endpoint cryptographic module generating secret keys, wherein the secret keys are generated by encrypting information comprising one or more encryption factors including a first encryption factor and a second encryption factor,
wherein the first encryption factor is polymorphic encrypted ciphertext converted from the collected profile attribute information input, the polymorphic encrypting generated by:
mapping indices from the collected profile attribute information to a knight's tour encryption cipher template generated by mapping characters to a knight's tour template matrix,
adding the mapped indices to a randomly generated silent password,
performing modular arithmetic resulting in the first encryption factor converted polymorphic encrypted ciphertext,
wherein the second encryption factor is polymorphic encrypted ciphertext converted from the first encryption factor, using the method of generating the first encryption factor encrypted ciphertext; and
an industrial internet encryption system server.

16. The system of claim 15, further comprising at least one of: an encryption module, a decryption module, an identity access management module, a universal wallet address module, a data nucleus aggregated information (DNA) module, a digital data nucleic authority (DDNA) module, a profile management module, and a registration module.

17. The system of claim 15, further comprising at least one of: a server encryption module, a server decryption module, a device registration module, a device transmission module, an Internet of Things (IoT) device admin module, a database, an Internet of Things (IoT) services module.

18. The industrial internet encryption system having a hardware processor of claim 15, further comprising:
a device registration module wherein the device registration module comprises at least one of: an Internet of Things (IoT) device tracking layer module, an Internet of Things (IoT) device application layer module, and an Internet of Things (IoT) device attributes layer module;
a device transmission module wherein the device transmission module comprises at least one module for: satellite communication, GPS communication, wireless communication, infrared communication, Wi-Fi communication, and Bluetooth communication; and
a device registration module wherein the device registration module comprises at least one of: an Internet of Things (IoT) permissions layer module, an Internet of Things (IoT) analytics layer module, an Internet of Things (IoT) roles layer module, and an Internet of Things (IoT) policy layer module.

19. The system of claim 15, further comprising:
an Internet of Things (IoT) Services module wherein the Internet of Things (IoT) services module comprises at least one of: an Internet of Things (IoT) device commands module, an Internet of Things (IoT) device communication module, an Internet of Things (IoT) analytics module, and an Internet of Things (IoT) automations module; and
a registration module wherein the registration module comprises at least one of: a data nucleus aggregated information (DNA) registration module, a digital data nucleic authority (DDNA) information registration module, a universal wallet address (UWA) management module, and a profile distribution module.

* * * * *